(12) United States Patent
Higashi et al.

(10) Patent No.: US 8,927,185 B2
(45) Date of Patent: Jan. 6, 2015

(54) TONER AND TONER PRODUCTION METHOD

(71) Applicant: Canon Kabushiki Kaisha, Tokyo (JP)

(72) Inventors: Ryuji Higashi, Kawasaki (JP); Akiko Kitao, Kawasaki (JP); Taichi Shintou, Saitama (JP); Takeshi Miyazaki, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/971,059

(22) Filed: Aug. 20, 2013

(65) Prior Publication Data
US 2014/0057203 A1   Feb. 27, 2014

(30) Foreign Application Priority Data
Aug. 22, 2012 (JP) ................................. 2012-183478

(51) Int. Cl.
*G03G 9/09* (2006.01)
*G03G 9/08* (2006.01)
*C09B 47/04* (2006.01)

(52) U.S. Cl.
CPC ............... *G03G 9/09* (2013.01); *G03G 9/0918* (2013.01); *G03G 9/081* (2013.01); *C09B 47/04* (2013.01)
USPC .............. 430/108.1; 430/108.21; 430/108.24; 430/137.15

(58) Field of Classification Search
USPC ................. 430/108.1, 108.21, 108.24, 137.15
See application file for complete search history.

(56) References Cited

U.S. PATENT DOCUMENTS

| | | | |
|---|---|---|---|
| 6,813,449 B2 | 11/2004 | Miyazaki et al. | |
| 7,141,342 B2 | 11/2006 | Toyoda et al. | |
| 7,264,910 B2 | 9/2007 | Toyoda et al. | |
| 7,288,357 B2 | 10/2007 | Toyoda et al. | |
| 7,833,685 B2 | 11/2010 | Tanaka et al. | |
| 7,833,687 B2 | 11/2010 | Kato et al. | |
| 8,211,606 B2 | 7/2012 | Murai et al. | |
| 8,241,827 B2 | 8/2012 | Yasukawa et al. | |
| 2012/0040285 A1 | 2/2012 | Shibata et al. | |
| 2012/0231388 A1 | 9/2012 | Kawamura et al. | |
| 2013/0108952 A1 | 5/2013 | Nakano et al. | |
| 2013/0202998 A1 | 8/2013 | Higashi et al. | |
| 2014/0057202 A1 | 2/2014 | Kitao et al. | |
| 2014/0080049 A1 | 3/2014 | Ujifusa et al. | |
| 2014/0113229 A1 | 4/2014 | Tani et al. | |

FOREIGN PATENT DOCUMENTS

| | | |
|---|---|---|
| EP | 1 408 093 A1 | 4/2004 |
| EP | 1 561 790 A1 | 8/2005 |
| EP | 1 936 441 A1 | 6/2008 |
| EP | 2 361 284 B1 | 5/2013 |
| JP | 2008-176311 A | 7/2008 |
| JP | 2009-122496 A | 6/2009 |
| WO | 2010/053510 A2 | 5/2010 |

OTHER PUBLICATIONS

Meyer, et al., "Polymere mit dem Zentralatom eines Makrocyclus in der Hauptkette, 1", Die Makromolekulare Chemie, 1974, vol. 175, pp. 714-728.
Sinha, et al., "Thin Polyurethane Films of Polyhydroxysilicon Phthalocyanine and Bis-phthalocyanine Derivatives", Polymer Journal, 1995, vol. 27, No. 11, pp. 1079-1084.
Brewis, et al., "Silicon Phthalocyanines with Axial Dendritic Substituents", Angew. Chem. Int. Ed., 1998, vol. 37, No. 8, pp. 1092-1094.
Dirk, et al., "Cofacial Assembly of Partially Oxidized Metallomacrocycles as an Approach to Controlling Lattice Architecture in Low-Dimensional Molecular Solids. Chemical and Architectural Properties of the "Face-to-Face" Polymers [M(phthalocyaninato)O]n, Where M=Si,Ge, and Sn", Journal of the American Chemical Society, 1983, vol. 105, pp. 1539-1550.
European Search Report dated Dec. 2, 2013 in European Application No. 13180990.7.

*Primary Examiner* — Hoa V Le
(74) *Attorney, Agent, or Firm* — Fitzpatrick, Cella, Harper and Scinto

(57) ABSTRACT

The present invention provides a toner having superior color development property and a method of producing a toner having favorable particle size distribution and color development property, in which the toner containing a binder resin and a colorant that contains a phthalocyanine pigment represented by general formula (1), and the method for producing the toner.

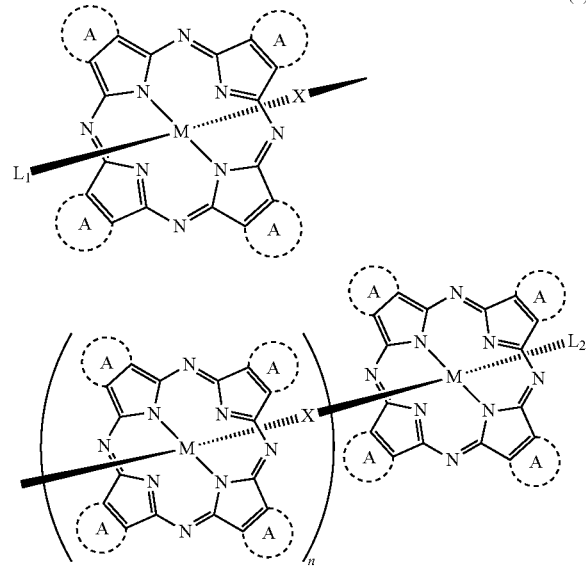

General Formula (1)

16 Claims, No Drawings

TONER AND TONER PRODUCTION METHOD

BACKGROUND OF THE INVENTION

1. Field of the Invention

The present invention relates to a toner used in a recording method such as electrophotography, electrostatic recording, magnetic recording or toner-jet recording, and to a method for producing the toner.

2. Description of the Related Art

There has been a growing demand for high image quality of color images in image-forming apparatuses. In image-forming apparatuses such as digital full-color copiers and printers, an original image is first subjected to color separation with blue, green and red color filters. An electrostatic latent image corresponding to the original image is then formed on a photosensitive member, which is then developed using yellow, magenta, cyan and black color developers. Consequently, the tinting strength of the colorant present in each color of developer has a considerable effect on image quality.

More specifically, high image quality is required that approaches color reproduction in accordance with the Japan Color Certification System of the Japanese printing industry as well as Adobe RGB used in RGB workflow.

However, at present, further improvement of colorants is required in order to reproduce image quality equivalent to Japan Color or Adobe RGB.

In the case of cyan colorants in particular, copper phthalocyanine compounds that are widely used at present are unable to adequately expand color space, and it is therefore said to be essential to develop new coloring materials (see Japanese Patent Application Laid-open No. 2009-122496).

In order to solve the above-mentioned problems, a cyan colorant has been disclosed that contains a phthalocyanine compound having a substituent on a central metal atom, and in the case of using this cyan colorant, an electrostatic charge image developing toner is obtained that has high lightness and favorable color tone (see Japanese Patent Application Laid-open No. 2009-122496).

In addition, Japanese Patent Application Laid-open No. 2008-176311 discloses that full-color images having high chroma and high lightfastness are obtained by using a toner that contains a colorant containing a compound in which Si phthalocyanine structures are linked by —O— or —O—Si(R)$_2$—O—.

SUMMARY OF THE INVENTION

However, further improvement of toner color development property was still required.

In addition, toner particle size distribution was affected by the type of colorant and toner production method.

Therefore, the present invention provides solution for the above-mentioned problems.

Namely, the present invention provides a toner having superior color development property.

In addition, the present invention provides a method of producing a toner having favorable particle size distribution and color development property.

The above problems are achieved by the following inventions.

Namely, the present invention in its first aspect provides a toner containing a binder resin and a colorant, wherein the colorant contains a phthalocyanine pigment having a structure represented by the following general formula (1).

In addition, the present invention in its second aspect provides a method of producing a toner, comprising the step of producing toner particles by dispersing a polymerizable monomer composition containing a polymerizable monomer and a colorant in an aqueous medium, and granulating particles of the polymerizable monomer composition followed by polymerizing the polymerizable monomer, wherein the colorant contains a phthalocyanine pigment having a structure represented by the following general formula (1).

[Chem. 1]

General Formula (1)

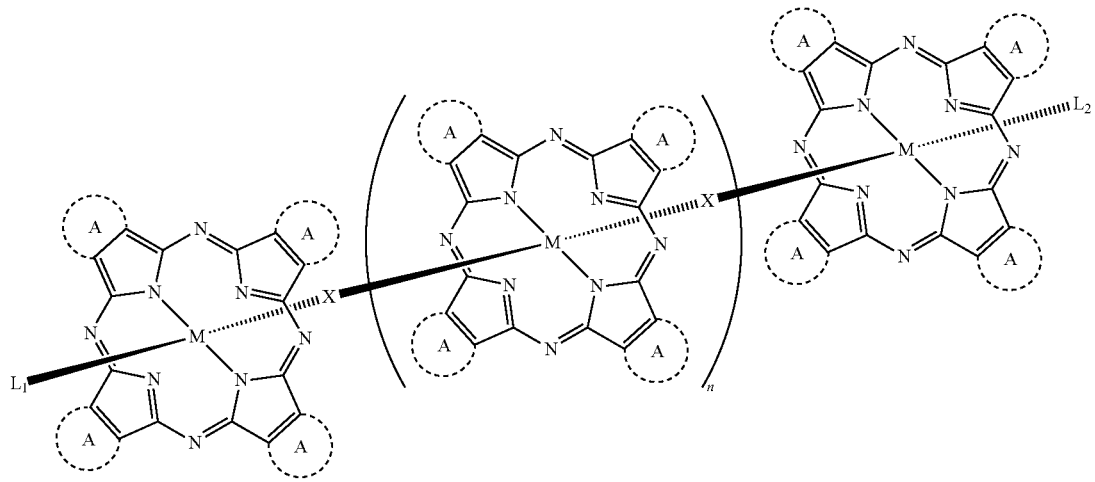

In the above-mentioned general formula (1),

X represents —O—CH$_2$—R$^1$—CH$_2$—O—,

R$^1$ represents a monocyclic or polycyclic cyclic hydrocarbon group or —CR$^2$R$^3$—, R$^2$ and R$^3$ represent alkyl group,

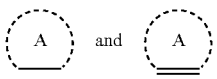

each independently represent a substituted or unsubstituted aryl ring or a heterocycle containing one or two nitrogen atoms, M represents a metal atom selected from the group consisting of Si, Ge and Sn, $L_1$ and $L_2$ each independently represent a halogen atom, hydroxyl group, —O—$CH_2$—$R^4$—$CH_2$—$OR^8$, —O—$CH_2$—$R^5$—$OR^9$ or —$OR^{10}$, $R^4$ and $R^5$ represent a monocyclic or polycyclic cyclic hydrocarbon group or —$CR^6R^7$—, $R^6$ and $R^7$ represent alkyl group, $R^8$ to $R^{10}$ each independently represent a hydrogen atom, methyl group or trimethylsilyl group, and n represents an integer of 1 or more.

According to the present invention, a toner can be provided that has superior color development property. In addition, according to the present invention, a method for producing a toner having favorable particle size distribution and color development property can be provided.

Further features of the present invention will become apparent from the following description of exemplary embodiments.

DESCRIPTION OF THE EMBODIMENTS

The following provides a more detailed explanation of the present invention.

The inventors of the present invention conducted extensive studies to solve the above-mentioned problems. As a result, it was found that a toner having superior color development property can be provided that contains a binder resin and a colorant, wherein the colorant contains a phthalocyanine pigment having a structure represented by the following general formula (1).

In the above-mentioned general formula (1),

X represents —O—$CH_2$—$R^1$—$CH_2$—O—, $R^1$ represents a monocyclic or polycyclic cyclic hydrocarbon group or —$CR^2R^3$—, $R^2$ and $R^3$ represent alkyl group,

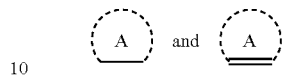

each independently represent a substituted or unsubstituted aryl ring or a heterocycle containing one or two nitrogen atoms, M represents a metal atom selected from the group consisting of Si, Ge and Sn, $L_1$ and $L_2$ each independently represent a halogen atom, hydroxyl group, —O—$CH_2$—$R^4$—$CH_2$—$OR^8$, —O—$CH_2$—$R^5$—$OR^9$ or —$OR^{10}$, $R^4$ and $R^5$ represent a monocyclic or polycyclic cyclic hydrocarbon group or —$CR^6R^7$—, $R^6$ and $R^7$ represent alkyl group, $R^8$ to $R^{10}$ each independently represent a hydrogen atom, methyl group or trimethylsilyl group, and n represents an integer of 1 or more.

<Phthalocyanine Pigment>

An explanation is first provided of the above-mentioned phthalocyanine pigment having a structure represented by general formula (1).

Furthermore, a pigment in the present invention refers to a coloring material having low solubility in organic solvents in the manner of styrene, toluene, methyl ethyl ketone, ethyl acetate, acetone, methanol and N,N-dimethylformamide (DMF), water and mixtures thereof. "Low solubility" in the present invention refers to having solubility inorganic solvents, water and mixtures thereof of less than 0.1% by mass.

There are no particular limitations on the monocyclic cyclic hydrocarbon group represented by $R^1$ in general formula (1), and examples thereof include a cyclobutylene group, cyclopentylene group, cyclohexylene group, cycloheptylene group and cyclooctylene group.

[Chem. 2]

General Formula (1)

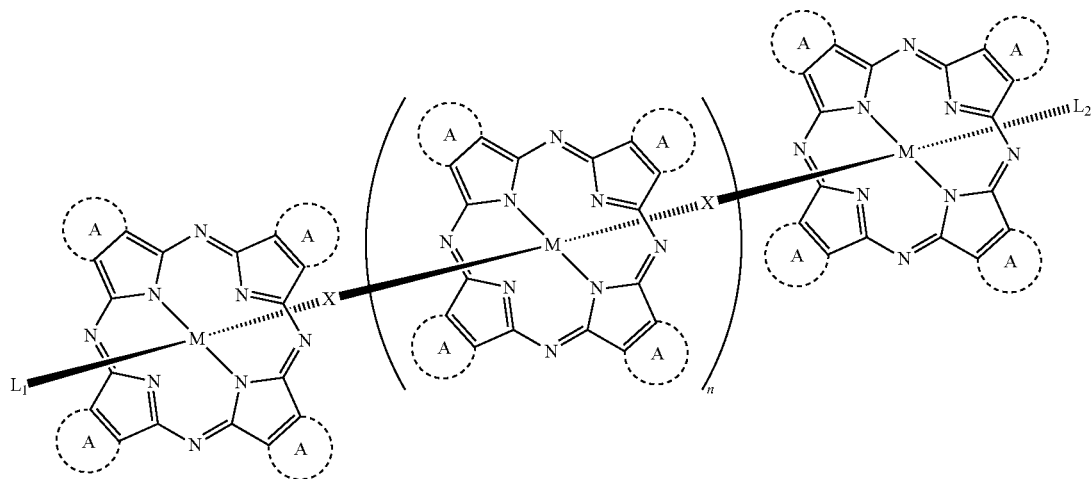

There are no particular limitations on the polycyclic cyclic hydrocarbon group represented by $R^1$ in general formula (1), and examples thereof include a norbornanediyl group, norbornenediyl group and adamantanediyl group.

There are no particular limitations on the alkyl groups represented by $R^2$ and $R^3$ in general formula (1), and examples thereof include a methyl group, ethyl group, n-propyl group, iso-propyl group, n-butyl group, sec-butyl group, tert-butyl group, octyl group, dodecyl group and nonadecyl group.

Among these, from the viewpoint of color development property, $R^1$ is preferably a monocyclic or polycyclic cyclic hydrocarbon group, more preferably a polycyclic cyclic hydrocarbon group, and even more preferably a norbornanediyl group, norbornenediyl group or adamantanediyl group.

Examples of the aryl ring represented by

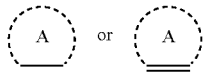

in general formula (1) include a benzene ring and naphthyl ring.

Furthermore, these rings may have substituents provided they do not affect color development property. Specific examples of substituents include alkyl groups in the manner of a methyl group, propyl group or tert-butyl group, alkoxy groups in the manner of a methoxy group, ethoxy group, propoxy group, butoxy group or hexyloxy group, a nitro group, and a halogen atom in the manner of a chlorine atom. From the viewpoint of synthesis, these substituents are not limited to being regular, but rather may also be various isomers. These isomers do not have a significant effect on color development property.

Examples of a heterocycle containing one or two nitrogen atoms represented by

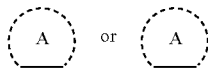

in general formula (1) include a pyridine ring, pyrazine ring, pyrrolidine ring, piperidine ring, azepane ring and azocane ring.

Among these, from the viewpoint of color development property, a substituted or unsubstituted benzene ring, pyridine ring or pyrazine ring is preferable, a substituted or unsubstituted benzene ring is more preferable, and a benzene ring having a tert-butyl group is even more preferable.

M in general formula (1) represents any metal atom selected from the group consisting of Si, Ge and Sn, and from the viewpoint of color development property, the metal atom is preferably Si.

Examples of halogen atoms represented by $L_1$ and $L_2$ in general formula (1) include chlorine atoms, bromine atoms and iodine atoms.

There are no particular limitations on monocyclic cyclic hydrocarbon groups represented by $R^4$ and $R^5$ in general formula (1), and examples thereof include cycloalkylene groups. Examples of these cycloalkylene groups include cyclobutylene groups, cyclopentylene groups, cyclohexylene groups, cycloheptylene groups and cyclooctylene groups.

There are no particular limitations on polycyclic cyclic hydrocarbon groups represented by $R^4$ and $R^5$ in general formula (1), and examples thereof include norbornanediyl groups, norbornenediyl groups and adamantanediyl groups.

There are no particular limitations on alkyl groups represented by $R^6$ and $R^7$ in general formula (1), and examples thereof include methyl groups, ethyl groups, n-propyl groups, iso-propyl groups, n-butyl groups, sec-butyl groups, tert-butyl groups, octyl groups, dodecyl groups and nonadecyl groups.

In addition, in the case of desiring to further increase hydrophobicity of $L_1$ and $L_2$, trimethylsilyl groups or methyl groups are used for $R^8$ to $R^{10}$.

In general formula (1), n represents an integer of 1 or more. In the case n is 0, function as a pigment having strong lightfastness is not adequately demonstrated as a result of having high solubility in solvents in the manner of toluene and ethanol. In contrast, although a larger value for n is preferable for use as a pigment having superior lightfastness, n is preferably from 1 to 10, and when considering lightfastness, n is more preferably from 2 to 10 since it becomes theoretically difficult to release active oxygen.

The phthalocyanine pigment having a structure represented by general formula (1) according to the present invention can be synthesized by referring to known methods described in, for example, Die Makromolekulare Chemie, 175, 714-728 (1974), Polymer Journal, 27, 11, 1079-1084 (1995), and Angew. Chem. Int. Ed., 37, 8, 1092-1094 (1998).

Although the following indicates one aspect of a method for producing the above-mentioned phthalocyanine pigment having a structure represented by general formula (1), the production method is not limited thereto.

[Chem. 3]

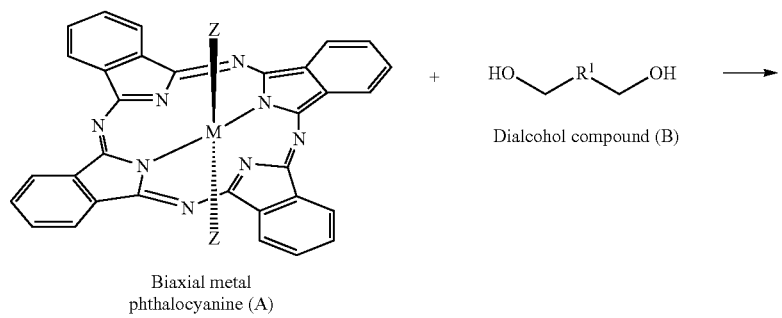

Biaxial metal phthalocyanine (A)

Dialcohol compound (B)

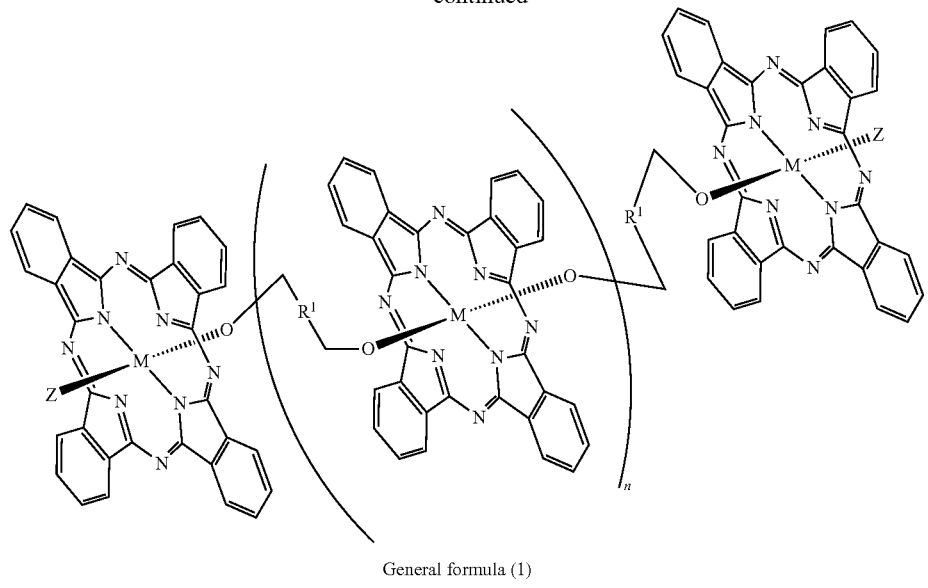

General formula (1)

The above-mentioned phthalocyanine pigment having a structure represented by general formula (1) can be easily obtained by condensing a biaxial metal phthalocyanine (A) and a dialcohol compound (B).

Preferable examples of Z in the above-mentioned biaxial metal phthalocyanine (A) include halogen atoms such as a chlorine atom and hydroxyl groups.

The biaxial metal phthalocyanine (A) was synthesized with reference to, for example, the Journal of the American Chemical Society, 105, 1539-1550 (1983). Namely, synthesis was carried out by stirring a 1,3-diiminoisoindoline derivative synthesized from a phthalonitrile derivative and a metal halide compound under conditions of heating at 200° C. or higher in a high boiling point solvent.

Next, a description is provided for the condensation step of the biaxial metal phthalocyanine (A) and the dialcohol compound (B).

Although this condensation step can also be carried out in the absence of a solvent, it is preferably carried out in the presence of a solvent. There are no particular limitations on the solvent provided it does not participate in the reaction, and examples thereof include toluene, xylene, monochlorobenzene, dichlorobenzene, pyridine and quinoline.

In addition, a mixture of two or more types of solvents can also be used, and the mixing ratio when using that mixture can be set arbitrarily. The amount of the above-mentioned reaction solvent used is preferably within the range of 0.1 times to 1000 times (based on mass), and more preferably 1.0 times to 150 times (based on mass), of the biaxial metal phthalocyanine.

The reaction temperature of the condensation step is preferably within the range of −80° C. to 250° C. and more preferably within the range of −20° C. to 150° C. The reaction is normally completed within 10 hours.

In the condensation step, the reaction may be made to proceed rapidly by adding a base as necessary.

Specific examples of bases used in the condensation step include metal alkoxides in the manner of potassium tert-butoxide, sodium tert-butoxide, sodium methoxide or sodium ethoxide; organic bases in the manner of piperidine, pyridine, 2-methylpyridine, diethylamine, triethylamine, isopropylethylamine, potassium acetate or 1,8-diazabicyclo[5.4.0]undeca-7-ene (DBU); organic bases in the manner of n-butyl lithium or tert-butyl magnesium chloride; and inorganic bases in the manner of sodium borohydride, sodium metal, sodium hydride or sodium carbonate. Preferable examples include potassium tert-butoxide, sodium hydride, sodium methoxide, sodium ethoxide and piperidine, while more preferable examples include sodium hydride and piperidine because of their low cost and handling ease.

The amount of the above-mentioned base (such as sodium hydride) used is preferably 1.0 equivalent to 100 equivalents, more preferably 1.5 equivalents to 20 equivalents, and even more preferably 5.0 equivalents to 10 equivalents based on a single hydroxyl group of the dialcohol compound (B).

Preferable examples of the above-mentioned dialcohol compound (B) include 2,2-dimethyl-1,3-propanediol, 2-ethyl-2-methyl-1,3-propanediol, 2-methyl-2-propyl-1,3-propanediol, 2,2-diethyl-1,3-propanediol, 2,2-di-n-octyl-1,3-propanediol, 2,2-diisobutyl-1,3-propanediol, 5-norbornene-2,2-dimethanol, 1,4-cyclohexane dimethanol, 1,2-cyclohexane dimethanol, 5-norbornene-2,3-dimethanol and 1,3-adamantane dimethanol.

Among these, bulky cyclic compounds like 1,4-cyclohexane dimethanol, 1,2-cyclohexane dimethanol, 5-norbornene-2,3-dimethanol or 1,3-adamantane dimethanol are preferable since they have superior color development property, and color development property in the case of using that having a structure having polycyclic cyclic hydrocarbon group in the manner of 5-norbornene-2,3-dimethanol or 1,3-adamantane dimethanol is particularly preferable.

In addition, the amount of the dialcohol compound (B) used is preferably 0.1 equivalents to 10 equivalents, more preferably 0.5 equivalents to 5 equivalents, and even more preferably 0.8 equivalents to 1.5 equivalents, based on the biaxial metal phthalocyanine (A).

Following completion of the reaction, the solid is filtered and the residue is washed with a nonpolar solvent in the manner of n-hexane, n-heptane or toluene, followed by washing with a polar solvent in the manner of an alcohol and then washing with ion exchange water and the like to obtain the phthalocyanine pigment having a structure represented by general formula (1). In addition, washing can also be carried out with a Soxhlet extractor and the like using a heated solvent in the manner of dichloromethane, chloroform, toluene, xylene or N,N-dimethylformamide.

The above-mentioned phthalocyanine pigment represented by general formula (1) may be used alone or two or more types may be used in combination corresponding to the toner production method or in order to adjust color tone.

The content of the above-mentioned phthalocyanine pigment having a structure represented by general formula (1) in a toner is preferably 1.0 part by mass to 100.0 parts by mass, more preferably 1.0 part by mass to 70.0 parts by mass, and even more preferably 1.0 part by mass to 50.0 parts by mass, based on 100 parts by mass of the binder resin.

Moreover, the above-mentioned phthalocyanine pigment having a structure represented by general formula (1) can also be used in combination with known pigments. Examples of known pigments that can be used include, but are not limited to, the pigments indicated below:

C.I. Pigment Blue 1, C.I. Pigment Blue 1:2, C.I. Pigment Blue 9, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 24, C.I. Pigment Blue 25, C.I. Pigment Blue 63, C.I. Pigment Blue 66, C.I. Pigment Blue 68, C.I. Pigment Blue 75 and C.I. Pigment Blue 79.

Preferable examples of the above-mentioned phthalocyanine pigment having a structure represented by general formula (1) include, but are not limited to, compounds (1) to (27) indicated below.

[Chem. 4]

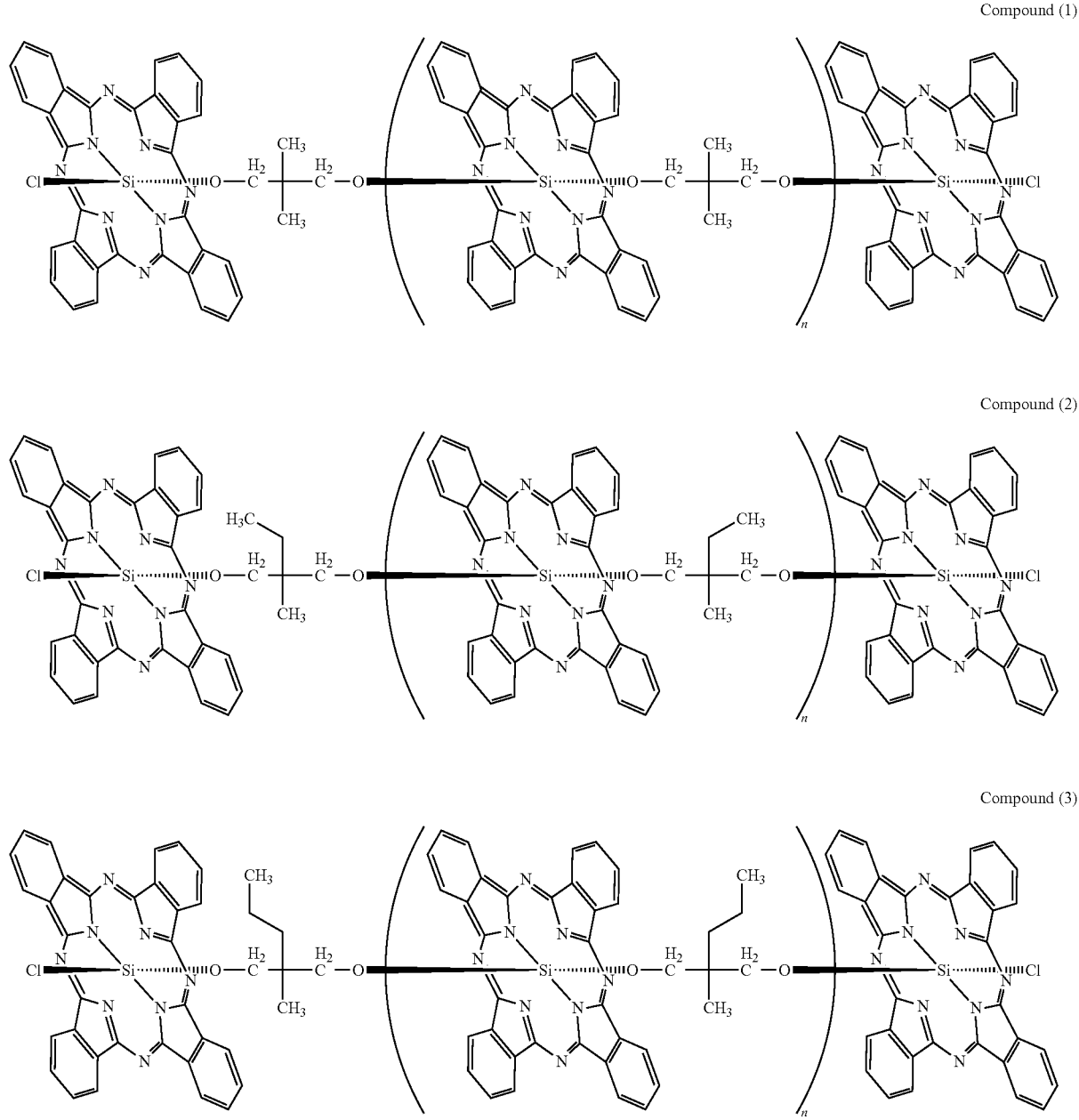

Compound (1)

Compound (2)

Compound (3)

-continued
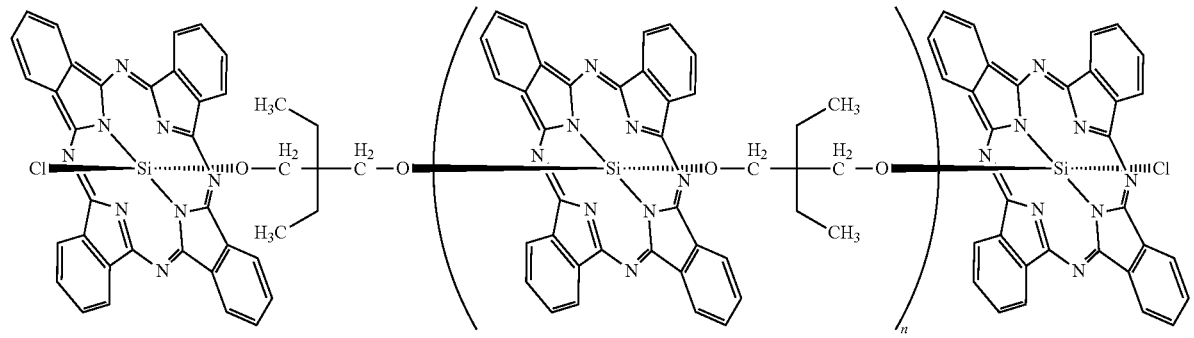
Compound (4)
[Chem. 5]
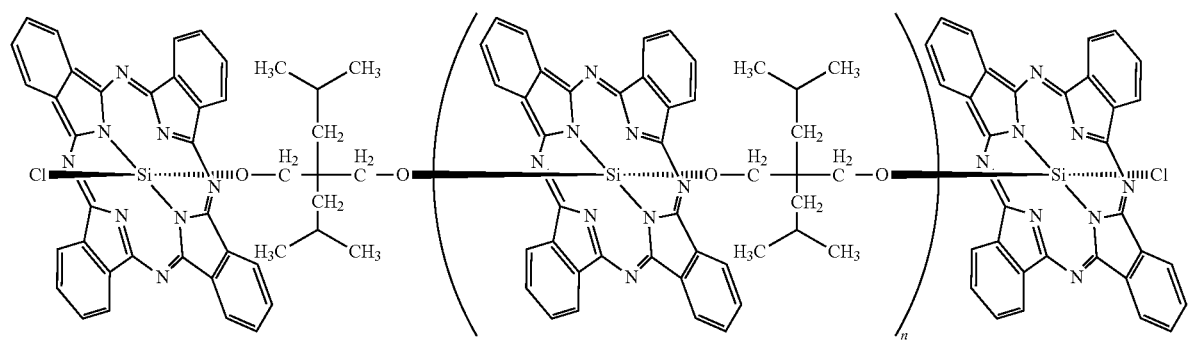
Compound 5
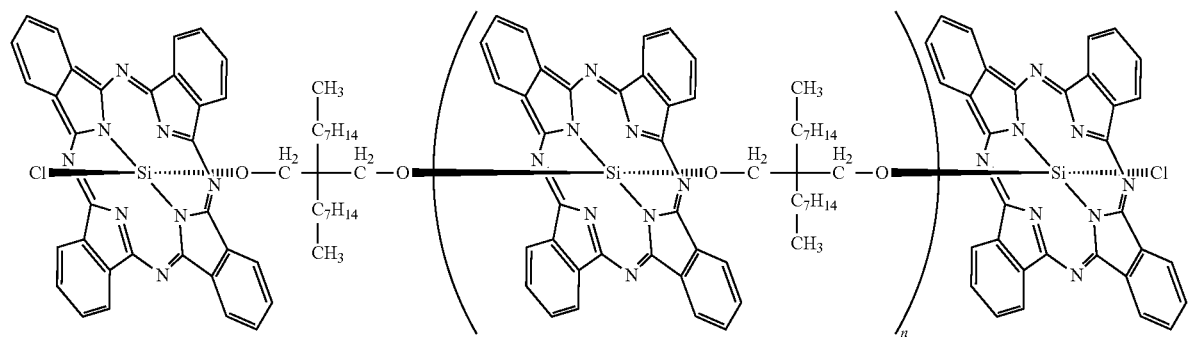
Compound (6)
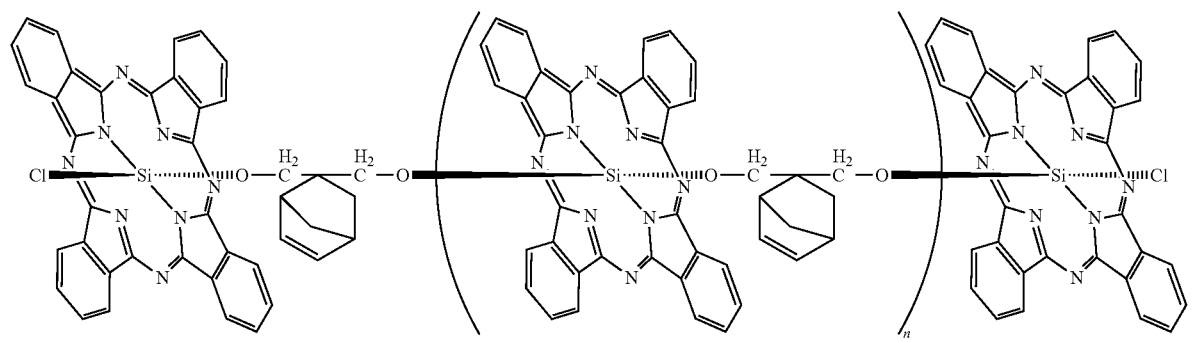
Compound (7)

-continued
Compound (8)
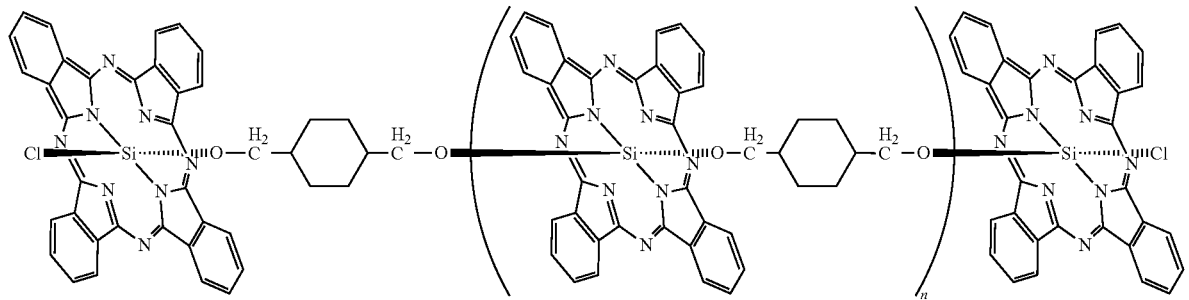
[Chem. 6]
Compound (9)
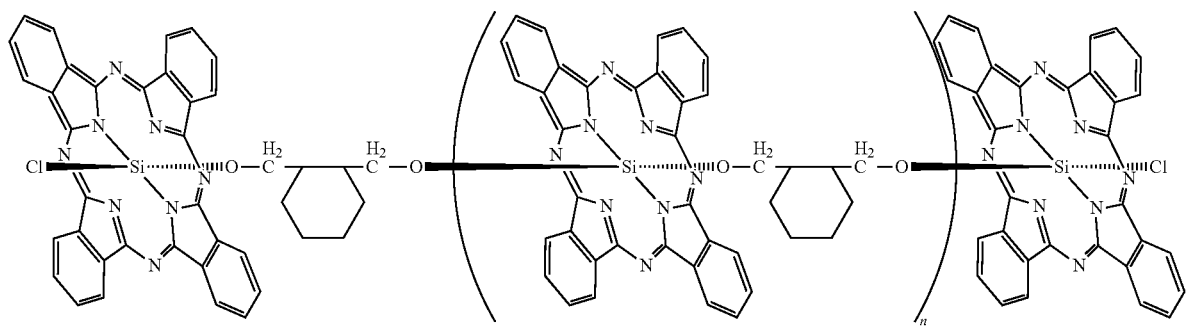
Compound (10)
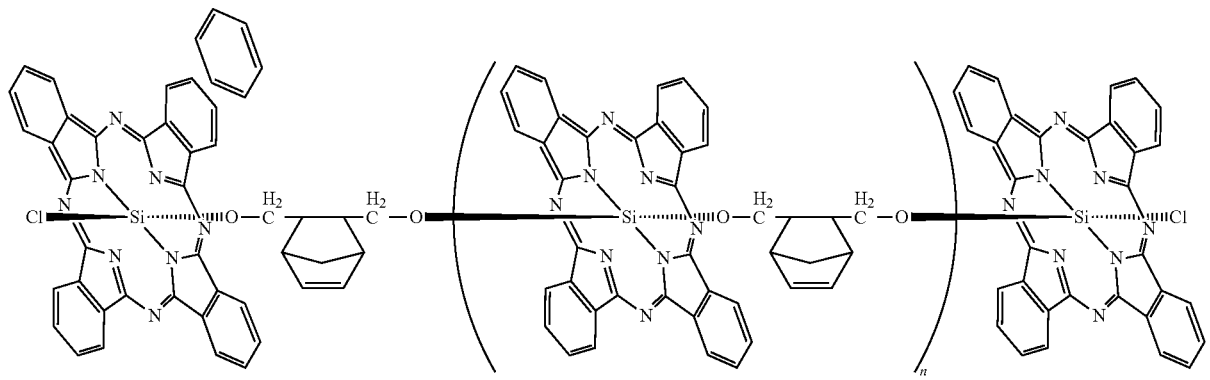
Compound (11)
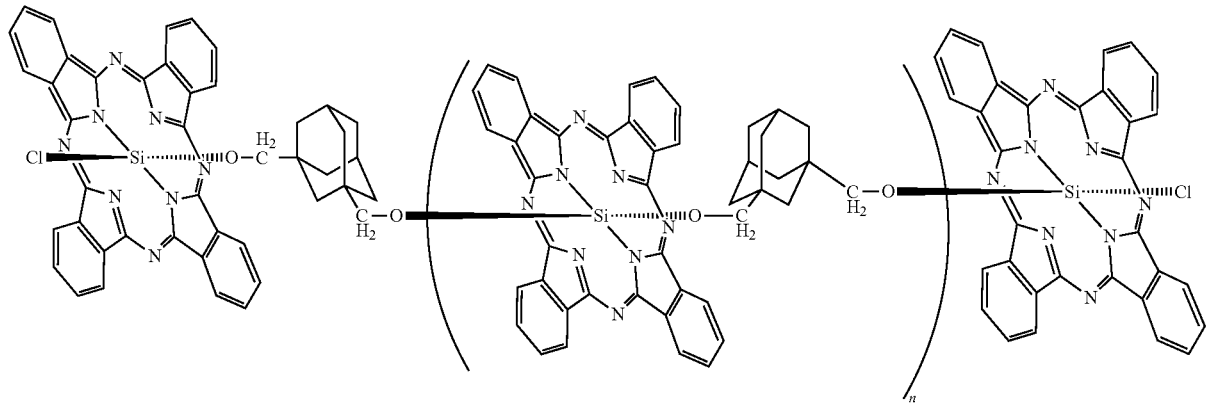

-continued
Compound (12)
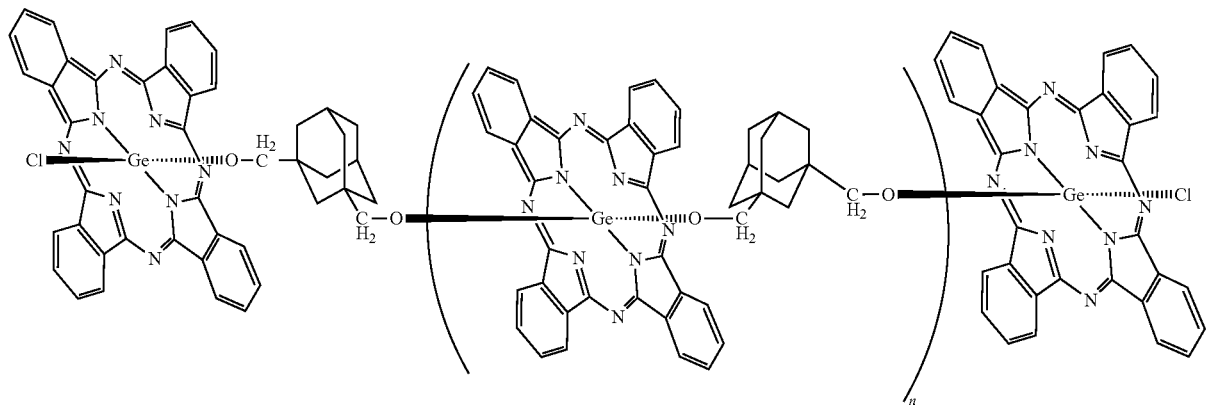
[Chem. 7]
Compound (13)
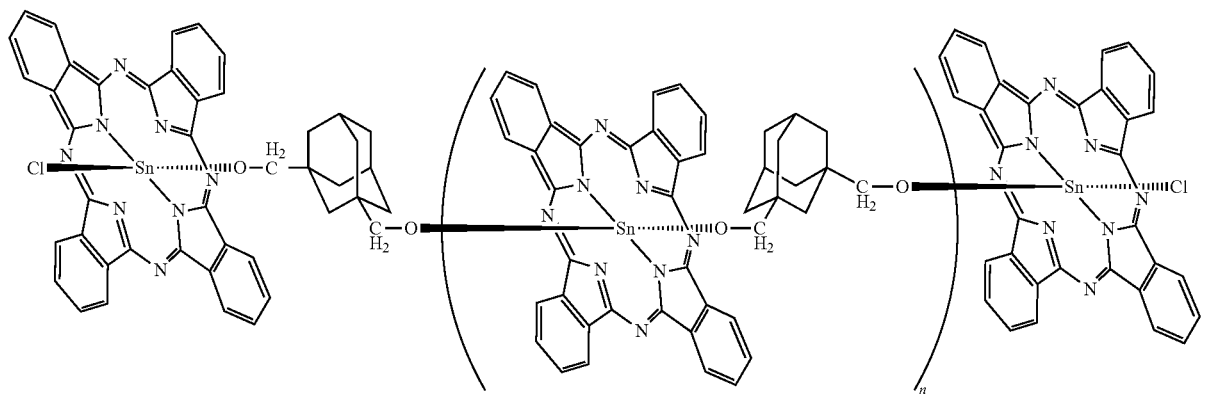
Compound (14)
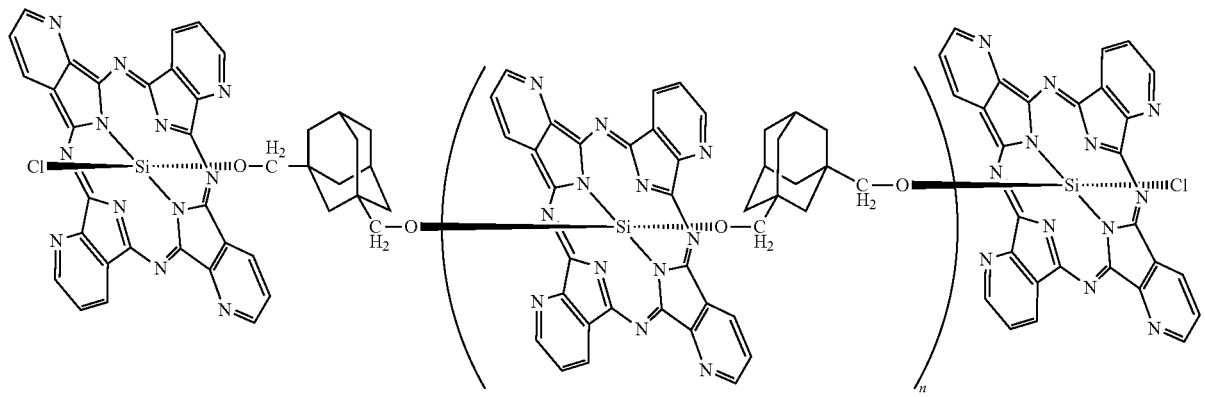

-continued
Compound (15)
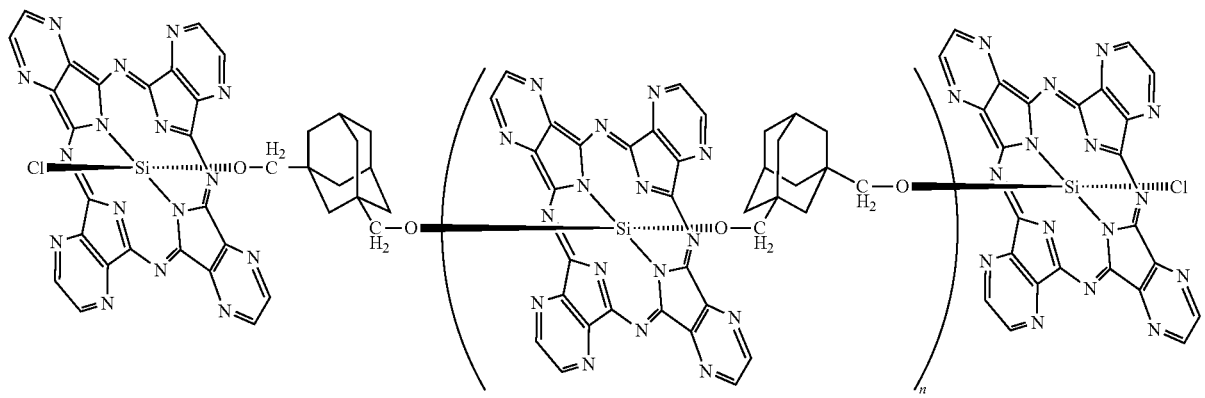
Compound (16)
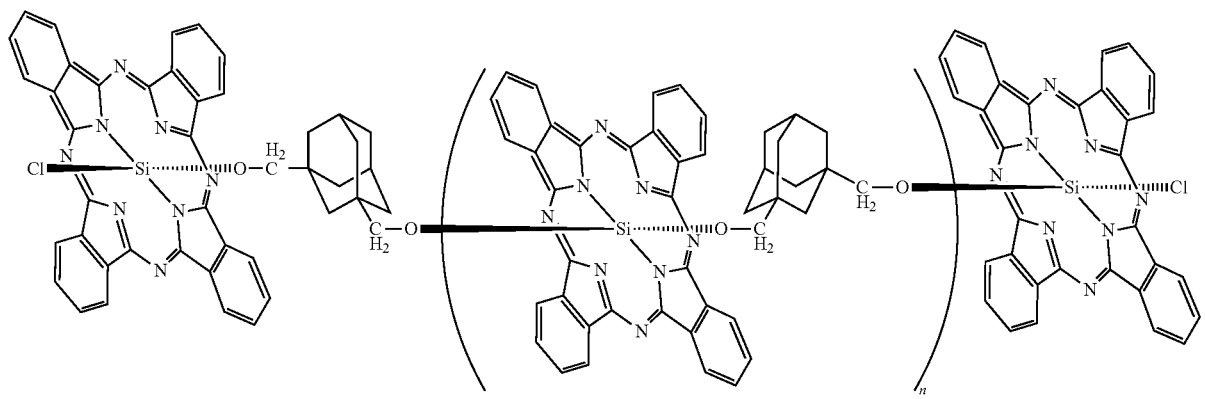
[Chem. 8]
Compound (17)
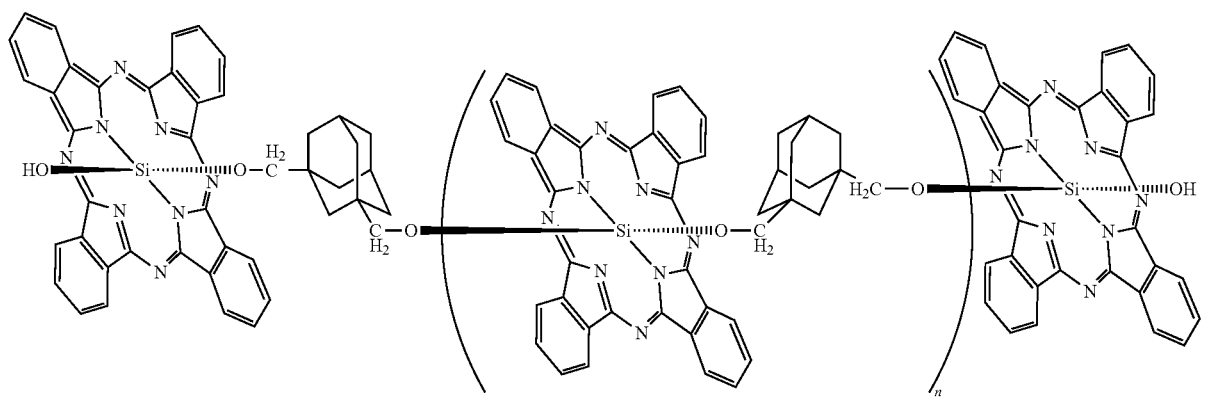

-continued
Compound (18)
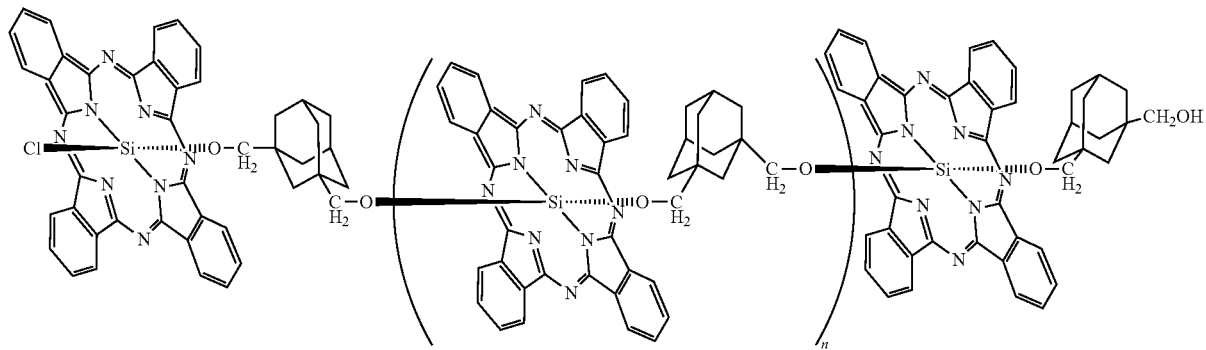
Compound (19)
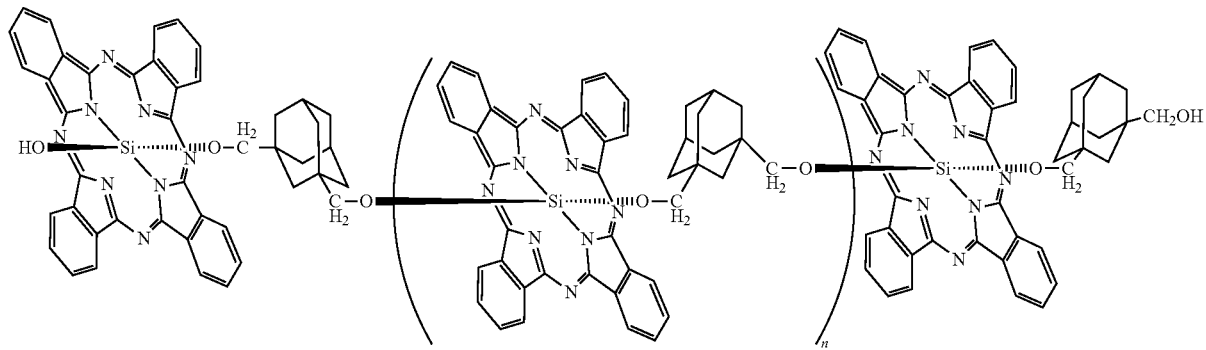
Compound (20)
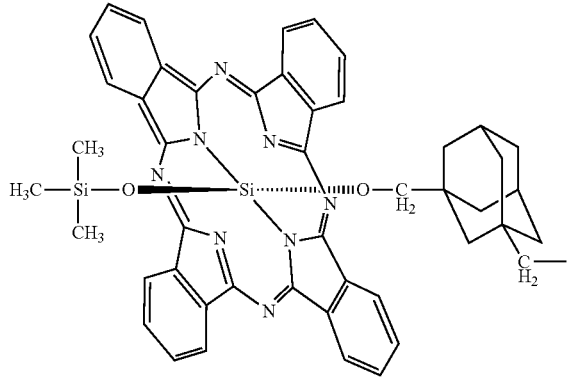
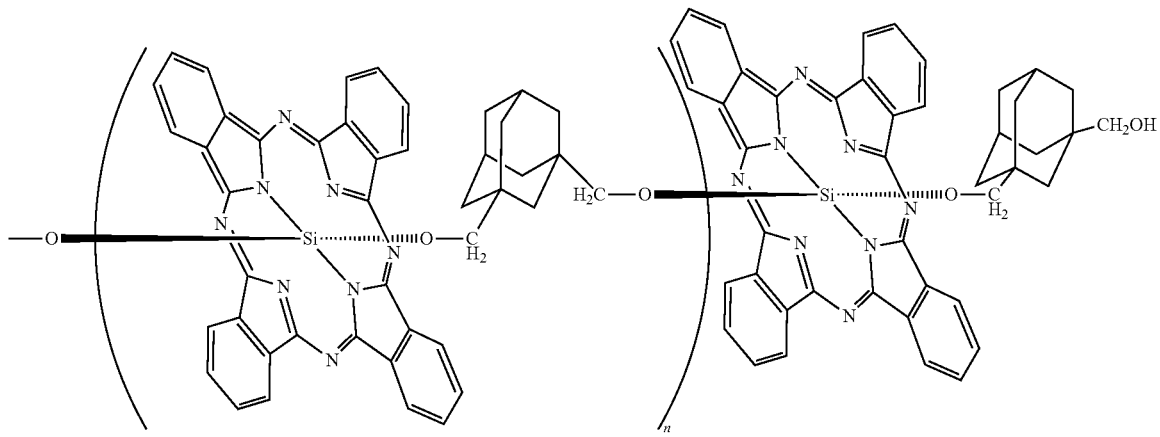

-continued
Compound (21)
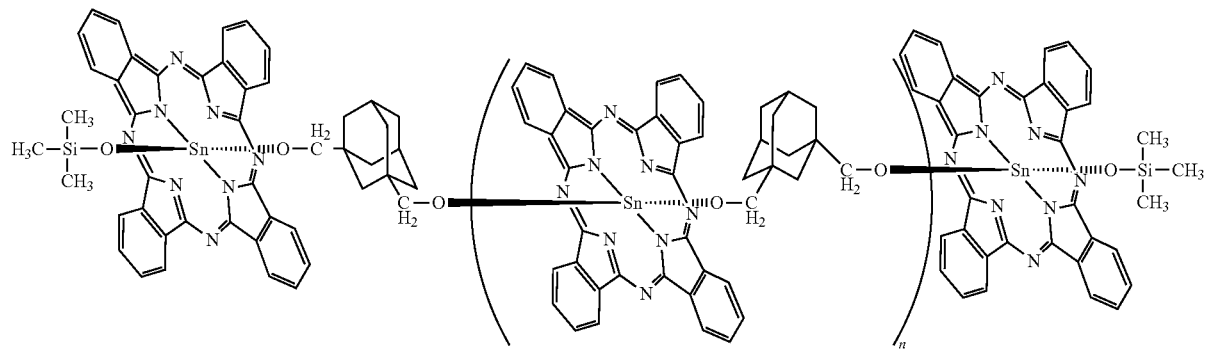
[Chem. 9]
Compound (22)
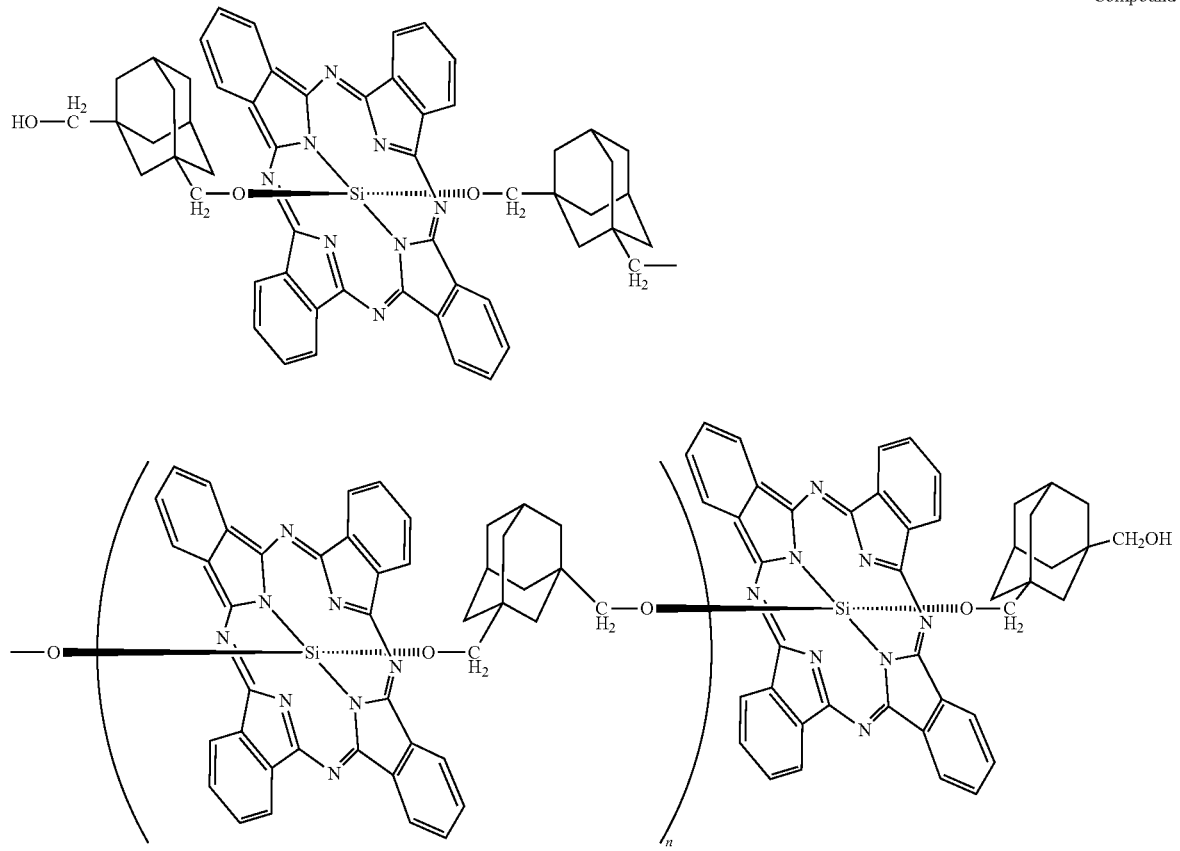
Compound (23)
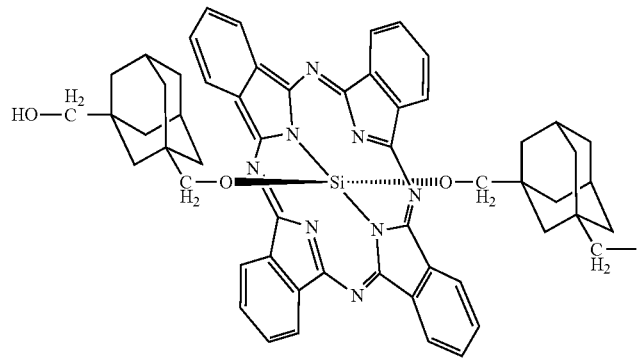

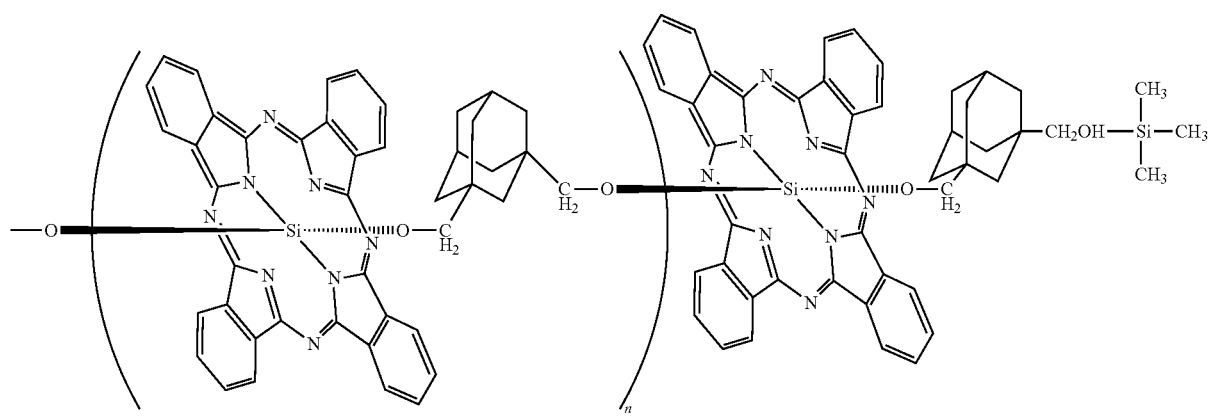
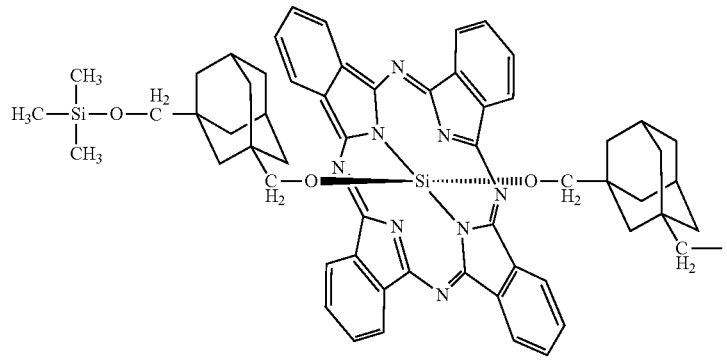
Compound (24)
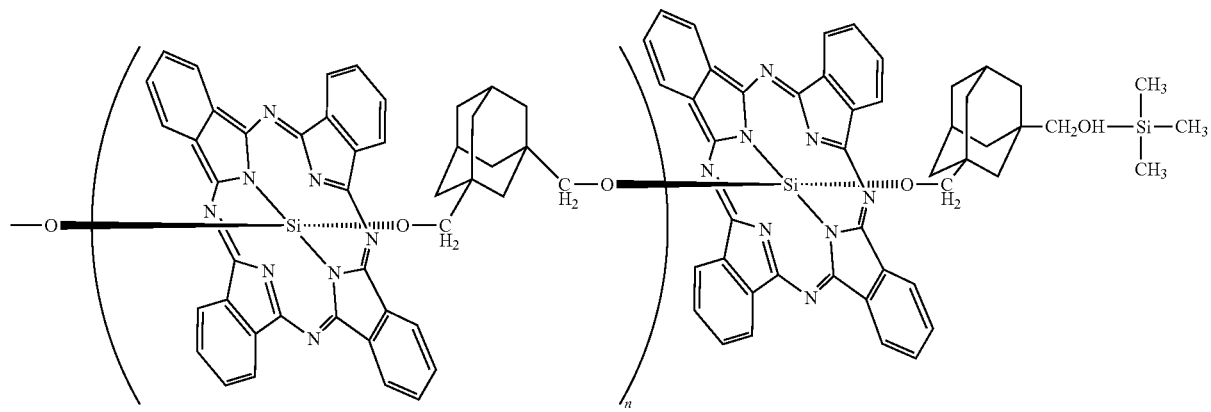
Compound (25)
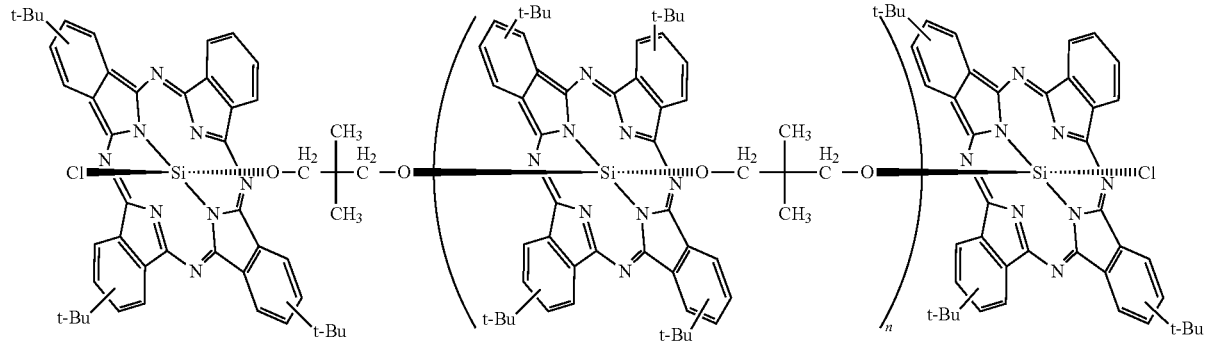

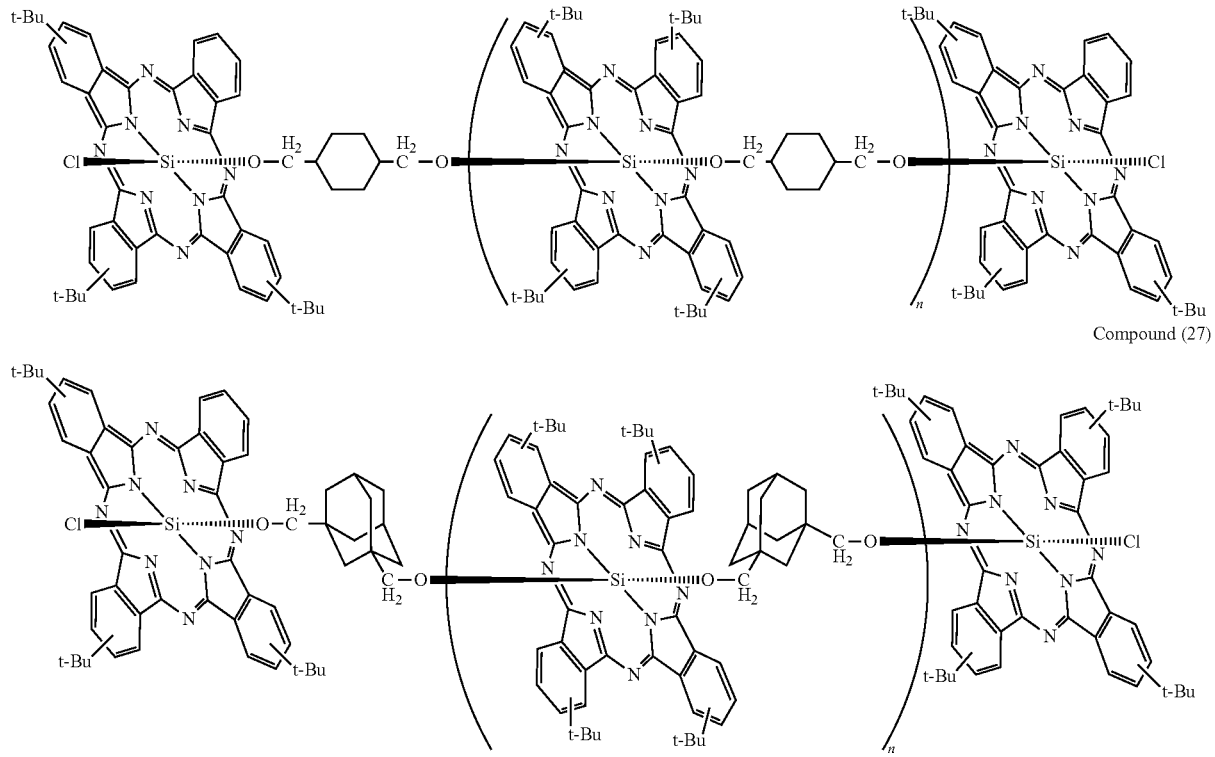

Compound (26)

Compound (27)

In the above-mentioned formulas, n represents the mixture of an integer of 1 to 10, and t-Bu represents a tert-butyl group.

<Toner>

The following provides a description of the toner.

(Binder Resin)

There are no particular limitations on the binder resin used in the toner of the present invention, and a thermoplastic resin is used preferably in consideration of fixing performance to paper.

Specific examples include homopolymers or copolymers of styrenes in the manner of styrene, parachlorostyrene or α-methylstyrene (styrene-based resins); homopolymers or copolymers of esters having a vinyl group in the manner of methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate or 2-ethylhexyl methacrylate (vinyl-based resins); homopolymers or copolymers of vinylnitriles in the manner of acrylonitrile or methacrylonitrile (vinyl-based resins); homopolymers or copolymers of vinyl ethers in the manner of vinyl ethyl ether or vinyl isobutyl ether (vinyl-based resins); homopolymers or copolymers of vinyl ketones in the manner of vinyl methyl ketone, vinyl ethyl ketone or vinyl isopropenyl ketone (vinyl-based resins); homopolymers of copolymers of olefins in the manner of ethylene, propylene, butadiene or isoprene (olefin-based resins); and, non-vinyl condensed resins in the manner of epoxy resin, polyester resin, polyurethane resin, polyamide resin, cellulose resin or polyether resin and graft polymers of these non-vinyl condensed resins and vinyl-based monomers. One type of these resins may be used alone or two or more types may be used in combination. When the number of terminal groups of the molecular chain of the above-mentioned polyester resin increases, environmental dependence of charging characteristics of the toner increases easily. Consequently, acid value is preferably 90 mgKOH/g or less and more preferably 50 mgKOH/g or less. In addition, hydroxyl value is preferably 50 mgKOH/g or less and more preferably 30 mgKOH/g or less.

The glass transition temperature of the above-mentioned polyester resin is preferably 50° C. to 75° C. and more preferably 55° C. to 65° C. In addition, the number average molecular weight (Mn) of the above-mentioned polyester-based resin is preferably 1,500 to 50,000 and more preferably 2,000 to 20,000. The weight-average molecular weight (Mw) of the above-mentioned polyester-based resin is preferably 6,000 to 100,000 and more preferably 10,000 to 90,000.

In the present invention, the binder resin can be used after having been crosslinked with a crosslinking agent in order to enhance mechanical strength of the toner as well as control the molecular weight of the binder resin in the toner.

There are no particular limitations on the crosslinking agent used in the toner of the present invention, and examples thereof are indicated below.

Examples of bifunctional crosslinking agents include divinylbenzene, bis(4-acryloxypolyethoxyphenyl)propane, 2,2-bis(4-methacryloxyphenyl)propane, diallyl phthalate, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol #200, #400 and #600 diacrylate, dipropylene glycol diacrylate, polypropylene glycol diacrylate, polyester-type diacrylates and those in which the above-mentioned diacrylate has been replaced with dimethacrylate.

There are no particular limitations on polyfunctional crosslinking agents, and examples thereof include pentaerythritol triacrylate, trimethylolethane triacrylate, trimethylolpropane triacrylate, tetramethylolmethane tetraacrylate, oligoester acrylate and methacrylates thereof, triallyl cyanurate, triallyl isocyanurate and triallyl trimellitate.

The amount of these crosslinking agents used is preferably 0.05 parts by mass to 10 parts by mass and more preferably 0.1 parts by mass to 5 parts by mass based on 100 parts by mass of a polymerizable monomer to be subsequently described.

(Wax)

The toner of the present invention may further contain a wax. There are no particular limitations on the wax used in the present invention and preferable examples thereof are indicated below:

hydrocarbon waxes in the manner of low molecular weight polyethylene, low molecular weight polypropylene, microcrystalline wax or paraffin wax; oxides of hydrocarbon waxes or block copolymers thereof in the manner of oxidized polyethylene wax; fatty acid ester waxes in the manner of carnauba wax, sasol wax or montanic acid ester wax; deoxidation products obtained by partially or fully deoxidizing fatty acid esters such as deoxidized carnauba wax; saturated linear fatty acids in the manner of palmitic acid, stearic acid or montanic acid; unsaturated fatty acids in the manner of brassidic acid, eleostearic acid or parinaric acid; saturated alcohols in the manner of stearyl alcohol, aralkyl alcohol, behenyl alcohol, carnaubyl alcohol, ceryl alcohol or melissyl alcohol; polyvalent alcohols in the manner of sorbitol; fatty acid amides in the manner of linoleic acid amide, oleic acid amide or lauric acid amide; saturated fatty acid bisamides in the manner of methylene bis stearic acid amide, ethylene bis capric acid amide, ethylene bis lauric acid amide or hexamethylene bis stearic acid amide; unsaturated fatty acid amides in the manner of ethylene bis oleic acid amide, hexamethylene bis oleic acid amide, N,N'-dioleyl adipic acid amide or N,N'-dioleyl sebacic acid amide; aromatic bisamides in the manner of m-xylene bis stearic acid amide or N,N'-distearyl isophthalic acid amide; fatty acid metal salts in the manner of calcium stearate, calcium laurate, zinc stearate or magnesium stearate (typically referred to as metal soaps); waxes obtained by grafting to aliphatic hydrocarbon waxes using vinyl-based monomers in the manner of styrene or acrylic acid; partial esterification products of fatty acids and polyvalent alcohols in the manner of behenic monoglyceride; methyl ester compounds having a hydroxyl group obtained by hydrogenation of vegetable oils; and, long-chain alkyl alcohols or long-chain alkyl carboxylic acids having 12 or more carbon atoms. Among these, hydrocarbon waxes, fatty acid ester waxes and saturated alcohols are preferable from the viewpoints of the balance between the releasability and the dispersibility in resin. In addition, one type of these waxes may be used alone or two or more types may be used in combination as necessary.

The melting point of the above-mentioned wax is preferably 50° C. to 200° C. and more preferably 55° C. to 150° C. As a result of making the melting point of the wax to be within the above-mentioned ranges, both blocking resistance of the toner and wax exudability during fixation can be realized.

Furthermore, melting point in the present invention refers to the peak temperature of the maximum endothermic peak on a differential scanning calorimetry (DSC) curve measured in compliance with ASTM D3418-82. More specifically, the DSC curve was first obtained in the second temperature ramp-up process in an environment at normal temperature and normal humidity by setting the measured temperature range to 30° C. to 200° C. and setting the ramp rate to 5° C./minute using a differential scanning calorimeter. The peak temperature of the maximum endothermic peak on the resulting DSC curve was then taken to be the melting point. Furthermore, the Model DSC822 Differential Scanning calorimeter manufactured by Mettler-Toledo Inc. was used for the differential scanning calorimeter.

The wax content in the toner, expressed as the total amount per 100 mass parts of the binder resin, is preferably from 1 to 25 mass parts and more preferably is from 3 to 10 mass parts. As a result of making the wax content to be within the above-mentioned ranges, both improvement of releasability of the toner and inhibition of melt adhesion of the toner to the surface of the developer carrying member and electrostatic latent image bearing member can be realized.

The toner of the present invention can also contain a charge control agent as necessary. This makes it possible to control the toner to the optimum triboelectric charge quantity corresponding to the developing system.

A known charge control agent can be used for the charge control agent, and a charge control agent having a rapid charging rate and is able to stably maintain a constant charge quantity is particularly preferable. Moreover, in the case of producing the toner by direct polymerization, a charge control agent that minimally inhibits polymerization and is substantially free of solubilization products in an aqueous medium is particularly preferable.

Charge control agents consist of charge control agents having negative charging characteristics that control the toner to negative charging characteristics, and charge control agents having positive charging characteristics that control the toner to positive charging characteristics.

Examples of charge control agents having negative charging characteristics include polymers or copolymers having sulfonic acid groups, sulfonate groups or sulfonic acid ester groups, salicylic acid derivatives and metal complexes thereof, monoazo metal compounds and aromatic oxycarbonic acid resin-based charge control agents.

Examples of charge control agents having positive charging characteristics include nigrosine and fatty acid metal salt-modified nigrosine, guanidine compounds, imidazole compounds, quaternary ammonium salts in the manner of tributylbenzylammonium-1-hydroxy-4-naphthosulfonate and tetrabutylammonium tetrafluoroborate and analogues thereof in the form of onium salts such as phosphonium salts and lake pigments thereof, triphenylmethane dyes and lake pigments thereof (wherein phosphotungstic acid, phosphomolybdic acid, phosphotungstomolybdic acid, tannic acid, lauric acid, gallic acid, ferricyanides or ferrocyanides are used as laking agents), metal salts of higher fatty acids, diorganotin oxides in the manner of dibutyl tin oxide, dioctyl tin oxide or dicyclohexyl tin oxide, diorganotin borates in the manner of dibutyl tin borate, dioctyl tin borate or dicyclohexyl tin borate, and resin-based charge control agents. These can be used alone or two or more types can be used in combination.

The toner of the present invention may have a fluidizing agent in the form of an inorganic fine powder added externally to the toner particles. Fine powders such as those of silica, titanium oxide, alumina or composite oxides thereof, and surface-treated fine powders can be used for the inorganic fine powder.

<Toner Production Method>

There are no particular limitations on the toner production method, and pulverization, suspension polymerization, suspension granulation, emulsion polymerization, and emulsion aggregation methods can be used.

Moreover, the phthalocyanine pigment having a structure represented by general formula (1) can also be used in a developer used in liquid development methods (to be referred to as a liquid developer).

The following provides a more detailed explanation of the above-mentioned toner production method.

(Suspension Polymerization Method)

Suspension polymerization is a method used to produce toner that comprises the step of dispersing a polymerizable monomer composition containing a polymerizable monomer and colorant in an aqueous medium and granulating particles of the polymerizable monomer composition, followed by producing toner particles by polymerizing the polymerizable monomer.

The suspension polymerization method may have an effect on particle size distribution of the resulting toner depending on the type of colorant.

However, the inventors of the present invention found that, in the case of using the above-mentioned phthalocyanine pigment having a structure represented by general formula (1) as colorant, a toner is obtained that has favorable particle size distribution even if produced by the suspension polymerization method.

The following provides a more detailed explanation of the suspension polymerization method.

First, a polymerizable monomer, a colorant containing the phthalocyanine pigment having a structure represented by general formula (1) of the present invention and, as necessary, a wax, polymerization initiator and the like are mixed to prepare a polymerizable monomer composition.

Next, the polymerizable monomer composition is dispersed in an aqueous medium followed by granulation of particles of the polymerizable monomer composition. Furthermore, this aqueous medium may also contain a dispersion stabilizer.

The polymerizable monomer present in particles of the polymerizable monomer composition is polymerized in the aqueous medium followed by filtration, washing and drying to obtain toner particles.

Examples of the above-mentioned polymerizable monomer include known polymerizable monomers used in toner binder resin.

Specific examples include styrene-based monomers such as styrene, o-methylstyrene, m-methylstyrene, p-methylstyrene, o-ethylstyrene, m-ethylstyrene or p-ethylstyrene; acrylate-based monomers such as methyl acrylate, ethyl acrylate, propyl acrylate, butyl acrylate, octylacrylate, dodecyl acrylate, stearylacrylate, behenyl acrylate, 2-ethylhexyl acrylate, dimethylaminoethyl acrylate, diethylaminoethyl acrylate, acrylonitrile or acrylic acid amide; methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile or methacrylic acid amide; olefin-based monomers such as ethylene, propylene, butylene, butadiene, isoprene, isobutylene or cyclohexene; vinyl halides such as vinyl chloride, vinylidene chloride, vinyl bromide or vinyl iodide; vinyl esters such as vinyl acetate, vinyl propionate or vinyl benzoate; vinyl ethers such as vinyl methyl ether, vinyl ethyl ether or vinyl isobutyl ether; and vinyl ketone compounds such as vinyl methyl ketone, vinyl hexyl ketone or methyl isopropenyl ketone. These can be used alone or two or more types can be used in combination corresponding to the application in which they are used.

Examples of the above-mentioned polymerization initiator include known polymerization initiators.

Examples thereof include azo compounds, organic peroxides, inorganic peroxides, organometallic compounds and photopolymerization initiators. Specific examples include azo-based polymerization initiators in the manner of 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile) and dimethyl 2,2'-azobis (isobutyrate); organic peroxide-based polymerization initiators in the manner of benzoyl peroxide, di-tert-butyl peroxide, tert-butylperoxyisopropyl monocarbonate, tert-hexylperoxybenzoate and tert-butylperoxybenzoate; inorganic peroxide-based polymerization initiators in the manner of potassium persulfate and ammonium persulfate, and redox initiators in the manner of hydrogen peroxide/ferrous iron-based, BPO/dimethylaniline-based and cerium(IV) salt/alcohol-based redox initiators. In addition, examples of photopolymerization initiators include acetophenone-based, benzoin ether-based and ketal-based photopolymerization initiators.

These polymerization initiators can be used alone or two or more types can be used in combination.

The concentration of polymerization initiator is preferably 0.1 parts by mass to 20 parts by mass and more preferably 0.1 parts by mass to 10 parts by mass based on 100 parts by mass of the polymerizable monomer. Furthermore, the type of polymerization initiator is selected with reference to the 10 hour half-life temperature.

A known inorganic or organic dispersion stabilizer can be used for the above-mentioned dispersion stabilizer.

Examples of inorganic dispersion stabilizers include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica and alumina.

Examples of organic dispersion stabilizers include polyvinyl alcohol, gelatin, methyl cellulose, methyl hydroxypropyl cellulose, ethyl cellulose, sodium salt of carboxymethyl cellulose, starch, and nonionic, anionic and cationic surfactants. Furthermore, examples of surfactants include sodium dodecyl sulfate, sodium tetradecyl sulfate, sodium pentadecyl sulfate, sodium octyl sulfate, sodium oleate, sodium laurate, potassium stearate and calcium oleate.

In addition, the amount of dispersion stabilizer added in the case of using a dispersion stabilizer to prepare an aqueous medium is preferably 0.2 parts by mass to 2.0 parts by mass based on 100 parts by mass of the polymerizable monomer. As a result of making the amount of dispersion stabilizer added to be within the above-mentioned range, drop stability of the polymerizable monomer composition in the aqueous medium is improved.

In addition, the aqueous medium is preferably prepared using water within a range of 300 parts by mass to 3000 parts by mass based on 100 parts by mass of the polymerizable monomer composition.

(Suspension Granulation Method)

The toner of the present invention can be obtained in the form of a toner having favorable particle size distribution even in the case of being produced by a suspension granulation method.

The suspension granulation method allows the use of a wide selection of binder resins, and facilitates the use of a polyester resin, generally considered to be advantageous in terms of fixing performance, as a main component. Consequently, it is a production method that is advantageous in the case of producing a toner having a resin composition that is difficult to produce with a suspension polymerization method.

Toner particles produced according to the suspension granulation method are produced, for example, in the manner described below.

First, a binder resin, a colorant containing a phthalocyanine pigment having a structure represented by general formula (1), and as necessary, wax or other toner components are mixed in a solvent to prepare a solvent composition. Next, the solvent composition is dispersed in an aqueous medium and particles of the solvent composition are granulated to obtain a toner particle suspension. The resulting suspension is then subjected to heating or reduced pressure to remove the solvent and obtain toner particles.

Examples of solvents that can be used in the suspension granulation method include hydrocarbons in the manner of toluene, xylene and hexane; halocarbons in the manner of methylene chloride, chloroform, dichloroethane, trichloroethane and carbon tetrachloride; alcohols in the manner of methanol, ethanol, butanol and isopropyl alcohol; polyvalent alcohols in the manner of ethylene glycol, propylene glycol, diethylene glycol and triethylene glycol; cellosolves in the manner of methyl cellosolve and ethyl cellosolve; ketones in the manner of acetone, methyl ethyl ketone and methyl isobutyl ketone; ethers in the manner of benzyl alcohol ethyl ether, benzyl alcohol isopropyl ether and tetrahydrofuran; and esters in the manner of methyl acetate, ethyl acetate and butyl acetate.

These solvents can be used alone or two or more types can be used by mixing. Among these solvents, a solvent that has a low boiling point and can adequately dissolve the binder resin is used preferably in order to easily remove the solvent in the toner particle suspension.

The amount of solvent used is preferably 50 parts by mass to 5000 parts by mass and more preferably 120 parts by mass to 1000 parts by mass based on 100 parts by mass of the binder resin.

The aqueous medium used in the suspension granulation method preferably contains a dispersion stabilizer. Known inorganic and organic dispersion stabilizers can be used for the dispersion stabilizer. For example, the dispersion stabilizers listed as examples of dispersion stabilizers used in the above-mentioned suspension polymerization method can be used.

Furthermore, the use of 0.01 parts by mass to 20 parts by mass of the dispersion stabilizer based on 100 parts by mass of the binder resin is preferable from the viewpoint of improving drop stability of the solvent composition in the aqueous medium.

In the suspension polymerization method and suspension granulation method, the added amount of the above-mentioned phthalocyanine pigment having a structure represented by general formula (1) is preferably 1.0 part by mass to 100 parts by mass, and more preferably 1.0 part by mass to 70 parts by mass, based on 100 parts by mass of the polymerizable monomer or binder resin.

In the suspension polymerization method and suspension granulation method, the amount of wax added in terms of total mass is preferably 1 part by mass to 25 parts by mass, and more preferably 3 parts by mass to 10 parts by mass, based on 100 parts by mass of the polymerizable monomer or binder resin. As a result of making the added amount of wax to be within the above-mentioned ranges, both improvement of releasability of the toner and inhibition of melt adhesion of toner to the surface of the developer carrying member and electrostatic latent image bearing member can be realized.

In the suspension polymerization method and suspension granulation method, a pigment dispersion explained below may be used for the colorant containing the phthalocyanine pigment having a structure represented by general formula (1) of the present invention.

The pigment dispersion is obtained by subjecting the phthalocyanine pigment having a structure represented by general formula (1) to dispersion treatment in a dispersion medium. An example of a specific production method is indicated below. The phthalocyanine pigment having a structure represented by general formula (1) is placed in a dispersion medium in the form of an organic solvent in which a polymerizable monomer or resin is dissolved, followed by adequately mixing into the dispersion medium by stirring and the like. Moreover, the pigment is finely dispersed into fine particles to obtain a pigment dispersion by applying mechanical shearing force with a disperser in the manner of a ball mill, paint shaker, dissolver, attritor, sand mill, high-speed mill or high-pressure disperser. Examples of the dispersion medium include water, organic solvent (containing polymerizable monomer) and mixtures thereof. Although an increase in viscosity of the liquid dispersion occurs when the colorant is dispersed in the dispersion medium, in the case of using the colorant containing the phthalocyanine pigment having a structure represented by general formula (1), there is little increase in viscosity of the liquid dispersion observed. In the case where an increase in viscosity of the liquid dispersion has occurred, it may be difficult to carry out stable granulation, and particle size distribution of the toner at that time becomes broad.

In the present invention, the amount of the phthalocyanine pigment having a structure represented by general formula (1) in the pigment dispersion is preferably 1.0 part by mass to 100 parts by mass, more preferably 2.0 parts by mass to 80 parts by mass, and even more preferably 3.0 parts by mass to 70 parts by mass, based on 100 parts by mass of the dispersion medium.

If the content of the phthalocyanine pigment is within the above-mentioned ranges, increases in viscosity and decreases in pigment dispersibility can be prevented, and favorable tinting strength can be demonstrated.

Examples of organic solvents able to be used for the dispersion medium of the pigment dispersion are indicated below:

alcohols in the manner of methyl alcohol, ethyl alcohol, denatured ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol and cyclohexanol; glycols in the manner of methyl cellosolve, ethyl cellosolve, diethylene glycol and diethylene glycol monobutyl ether; ketones in the manner of acetone, methyl ethyl ketone and methyl isobutyl ketone; esters in the manner of ethyl acetate, butyl acetate, ethyl propionate and cellosolve acetate; hydrocarbon-based solvents in the manner of hexane, octane, petroleum ether, cyclohexane, benzene, toluene and xylene; halogenated hydrocarbon-based solvents in the manner of carbon tetrachloride, trichloroethylene and tetrabromoethane; ethers in the manner of diethyl ether, dimethyl glycol, trioxane and tetrahydrofuran; acetals in the manner of methylal and diethyl acetal; organic acids in the manner of formic acid, acetic acid and propionic acid; and sulfur/nitrogen-containing organic compounds in the manner of nitrobenzene, dimethylamine, monoethanolamine, pyridine, dimethylsulfoxide and dimethylformamide.

In addition, a polymerizable monomer can also be used for the organic solvent.

The polymerizable monomer is an addition polymerizable or condensation polymerizable monomer, and is preferably an addition polymerizable monomer.

Specific examples include styrene-based monomers in the manner of styrene, o-methylstyrene, m-methylstyrene, p-methylstyrene, o-ethylstyrene, m-ethylstyrene and p-ethylstyrene; acrylate-based monomers in the manner of methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile and acrylic acid amide; methacrylate-based monomers in the manner of methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile and methacrylic acid amide; olefin-based monomers in the manner of ethylene, propylene, butylene, butadiene, isoprene, isobutylene and cyclohexene; vinyl halides in the manner of vinyl chloride, vinylidene chloride, vinyl bromide and vinyl iodide; vinyl esters in the manner of vinyl acetate, vinyl propionate and vinyl benzoate; vinyl ethers in the manner of vinyl methyl ether, vinyl ethyl ether and vinyl isobutyl ether; and vinyl ketone compounds in the manner of vinyl methyl ketone, vinyl hexyl ketone and methyl isopropenyl ketone.

These can be used alone or two or more types can be used in combination corresponding to the application in which they are used. In the case of producing a toner using the above-mentioned pigment dispersion, styrene or a styrene-based monomer among the above-mentioned polymerizable monomers is used preferably either alone or by mixing with other polymerizable monomers. Styrene is particularly preferable based on its handling ease.

A resin may also be added to the pigment dispersion. Specific examples of resins are indicated below:

polystyrene resins, styrene copolymers, polyacrylic acid resins, polymethacrylic acid resins, polyacrylic acid ester resins, polymethacrylic acid ester resins, acrylic acid-based copolymers, methacrylic acid-based copolymers, polyester resins, polyvinyl ether resins, polyvinyl methyl ether resins, polyvinyl alcohol resins, polyvinyl butyral resins, polyurethane resins and polypeptide resins.

These resins can be used alone or two or more types can be used by mixing.

In addition, in the pigment dispersion, other colorants can be used in combination provided they do not inhibit dispersibility of the phthalocyanine pigment having a structure represented by general formula (1) in the dispersion medium. Examples of colorants that can be used in combination are indicated below:

C.I. Pigment Blue 1, C.I. Pigment Blue 1:2, C.I. Pigment Blue 9, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 24, C.I. Pigment Blue 25, C.I. Pigment Blue 63, C.I. Pigment Blue 66, C.I. Pigment Blue 68, C.I. Pigment Blue 75 and C.I. Pigment Blue 79.

(Pulverization Method)

The toner of the present can be obtained in the form of a toner having favorable particle size distribution even in the case of being produced by a pulverization method.

Toner particles produced according to the pulverization method are produced, for example, in the manner described below.

A binder resin, a colorant containing the phthalocyanine pigment having a structure represented by general formula (1), and as necessary, wax, charge control agent and other additives and the like, are adequately mixed with a stirrer such as a Henschel mixer or ball mill. Next, the mixture is melted using a heating kneader in the manner of a roll, kneader or extruder. Moreover, wax and colorant are dispersed during the course of kneading the resins to make them mutually compatible. Following cooling and solidification, pulverization and classification are carried out to obtain toner particles.

Production apparatuses known among persons with ordinary skill in the art can be used for the above-mentioned mixer, heating kneader and classifier used for classification and the like.

Examples of binder resins include vinyl-based resins, polyester-based resins, epoxy-based resins, polyurethane-based resins, polyvinyl butyral-based resins, terpene-based resins, phenol-based resins, aliphatic or alicyclic hydrocarbon-based resins and aromatic petroleum-based resins. Among these, vinyl-based resins and polyester-based resins are preferable from the viewpoints of charging performance and fixing performance. The use of a polyester-based resin is particularly preferable since effects on charging performance and fixing performance increase. One type of these resins may be used alone or two or more types may be used in combination. In the case of using a mixture of two or more types of resins, resins having different molecular weights can be mixed in order to control viscoelastic properties of the toner.

The glass transition temperature of the above-mentioned binder resin is preferably 45° C. to 80° C. and more preferably 55° C. to 70° C. In addition, the number average molecular weight (Mn) of the binder resin is preferably from 2,500 to 50,000, while the weight-average molecular weight (Mw) is preferably from 10,000 to 1,000,000.

(Emulsion Aggregation Method)

The toner of the present can be obtained in the form of a toner having favorable particle size distribution even in the case of being produced by an emulsion aggregation method.

The following provides an explanation of an example of a method for producing toner particles by emulsion aggregation.

First, a dispersion liquid is prepared that contains a resin particle liquid dispersion, wax liquid dispersion, colorant particle liquid dispersion, and as necessary, other toner components. After mixing these liquid dispersions to prepare a mixed liquid, pH adjuster, aggregating agent, stabilizer and the like are added and mixed into the mixed liquid to form aggregate particles obtained by aggregating each particle (aggregation step). Subsequently, the aggregate particles are heated and fused (fusion step) followed by going through a filtration and washing step and drying step to obtain toner particles.

A dispersant such as a surfactant can be used in the liquid dispersion of each particle. For example, a colorant particle liquid dispersion can be prepared by dispersing a colorant in an aqueous medium together with a surfactant. Here, although the colorant particles can be dispersed in the aqueous medium by a known method, a media disperser in the manner of a rotary shear homogenizer, ball mill, sand mill or attritor, or a high-pressure counter collision type disperser, is used preferably.

Examples of dispersants include water-soluble polymers, inorganic compounds and ionic or nonionic surfactants. Surfactants are particularly preferable based on the problem of dispersibility, while ionic surfactants are used preferably in terms of ease of aggregation.

Specific examples of dispersants include water-soluble polymers in the manner of polyvinyl alcohol, methyl cellulose, carboxymethyl cellulose and sodium polyacrylate;

anionic surfactants in the manner of sodium dodecyl benzene sulfonate, sodium octadecyl sulfate, sodium oleate, sodium laurate and potassium stearate; cationic surfactants in the manner of lauryl amine acetate and lauryl trimethyl ammonium chloride; amphoteric surfactants in the manner of lauryl dimethyl amine oxide; nonionic surfactants in the manner of polyoxyethylene alkyl ethers, polyoxyethylene alkyl phenyl ethers and polyoxyethylene alkyl amines; and inorganic compounds in the manner of tricalcium phosphate, aluminum hydroxide, calcium sulfate, calcium carbonate and barium carbonate.

Furthermore, one type of these dispersants may be used alone or two or more types may be used in combination as necessary.

[Wax Liquid Dispersion]

The above-mentioned wax liquid dispersion is obtained by dispersing wax in an aqueous medium. The wax liquid dispersion is prepared according to a known method. The wax content in terms of total mass is preferably 1 part by mass to 25 parts by mass and more preferably 3 parts by mass to 10 parts by mass based on 100 parts by mass of the resin particles (solid content).

[Resin Particle Liquid Dispersion]

The above-mentioned resin particle liquid dispersion is obtained by dispersing resin particles in an aqueous medium.

Furthermore, the above-mentioned aqueous medium refers to a medium having water as a main component thereof. Specific examples of aqueous media include water per se, water containing a pH adjuster and water containing an organic solvent.

Although there are no particular limitations on the resin that composes the resin particles contained in the above-mentioned resin particle liquid dispersion provided it is a resin suitable for a toner having the characteristics indicated below, a thermoplastic binder resin having a glass transition temperature equal to or lower than the fixation temperature in an electrophotographic apparatus is preferable.

Specific examples include homopolymers of styrenes such as styrene, parachlorostyrene or α-methylstyrene, vinyl group-based monomers such as methyl acrylate, ethyl acrylate, n-propyl acrylate, lauryl acrylate, 2-ethylhexyl acrylate, methyl methacrylate, ethyl methacrylate, n-propyl methacrylate, lauryl methacrylate, 2-ethylhexyl methacrylate, acrylonitrile or methacrylonitrile, vinyl ether-based monomers such as vinyl methyl ether or vinyl isobutyl ether, vinyl ketone-based monomers such as vinyl methyl ketone, vinyl ethyl ketone or vinyl isopropenyl ketone, or polyolefin-based monomers such as ethylene, propylene or butadiene, copolymers obtained by combining two or more thereof, mixtures of these homopolymers and copolymers, and also non-vinyl-based condensed resins such as epoxy resin, polyester resin, polyurethane resin, polyamide resin, cellulose resin, polyether resin, as well as mixtures of these with the above-mentioned vinyl-based resins, and graft polymers obtained by polymerizing vinyl-based monomers in the presence thereof. Polystyrene resin or polyester resin is used particularly preferably in terms of the fixing performance and charging performance of the toner. One type of these resins may be used alone or two or more types may be used in combination.

The above-mentioned resin particle liquid dispersion is prepared using a known method. For example, in the case of a resin particle liquid dispersion containing resin particles having as a constituent thereof a vinyl-based monomer, and particularly a styrene-based monomer, a resin particle liquid dispersion can be prepared by carrying out emulsion polymerization on the monomer using a surfactant and the like. In addition, in the case of a resin produced by a method other than emulsion polymerization (such as a polyester resin), a resin dissolved in an organic solvent is dispersed in an aqueous solution obtained by dissolving an ionic surfactant and polymer electrolyte using a disperser such as a homogenizer. Subsequently, a resin particle liquid dispersion can be produced by evaporating off the solvent.

The volume-based median diameter of the resin particles in the resin particle liquid dispersion is preferably from 0.005 µm to 1.0 µm and more preferably from 0.01 µm to 0.4 µm.

The volume-based median diameter of the resin particles can be measured using a method such as dynamic light scattering (DLS), laser scattering, centrifugal precipitation, field-flow fractionation or the electrical sensing zone method. Furthermore, unless specifically stated otherwise, volume-based median diameter in the present invention refers to the volume-based 50% cumulative particle diameter value (D50) as measured at 20° C. and at a solid concentration of 0.01% by mass using the dynamic light scattering (DLS)/laser Doppler method.

[Colorant Particle Liquid Dispersion]

The colorant particle liquid dispersion is obtained by dispersing a colorant containing the phthalocyanine pigment having a structure represented by general formula (1) of the present invention in an aqueous medium.

A specific example of a method used to prepare the colorant particle liquid dispersion consists of placing the phthalocyanine pigment having a structure represented by general formula (1) in an aqueous solution in which an ionic surfactant and a polymer electrolyte is dissolved. The colorant particle liquid dispersion is then prepared by dispersing using a known disperser such as a media disperser in the manner of a rotary shear homogenizer, ball mill, sand mill or attritor, or a high-pressure counter collision type disperser. Furthermore, in the case the surface of the phthalocyanine pigment has low wettability, a small amount of an aqueous solvent in the manner of methanol or ethanol can also be used.

The content of the phthalocyanine pigment having a structure represented by general formula (1) is preferably 1 part by mass to 20 parts by mass based on 100 parts by mass of the resin particles (solid content).

On the other hand, the amount of the above-mentioned surfactant used is preferably 0.01 parts by mass to 20 parts by mass, and more preferably 0.1 parts by mass to 10 parts by mass, based on 100 parts by mass of the colorant containing the phthalocyanine pigment having a structure represented by general formula (1). The above-mentioned surfactant is more preferably used at 0.5 parts by mass to 5.0 parts by mass in order to facilitate removal of surfactant present in toner particles. In the case the amount of surfactant remaining in the resulting toner is low, effects tend to be obtained such as high image density of the toner and resistance to the occurrence of fogging.

[Aggregation Step]

Although there are no particular limitations on the method used to form aggregate particles in which the each of the above-mentioned particles have aggregated, a preferable example thereof consists of adding and mixing a pH adjuster, aggregating agent and dispersion stabilizer to a mixture of each of the above-mentioned liquid dispersions, and suitably applying temperature and mechanical power (stirring).

There are no particular limitations on the pH adjuster, and examples thereof include bases such as ammonia or sodium hydroxide and acids such as nitric acid or citric acid.

There are no particular limitations on the aggregating agent, and examples thereof include inorganic metal salts in the manner of sodium chloride, magnesium carbonate, magnesium chloride, magnesium nitrate, magnesium sulfate, calcium chloride and aluminum sulfate and metal complexes.

There are no particular limitations on the dispersion stabilizer, and examples thereof include water-soluble polymers in the manner of polyvinyl alcohol, methyl cellulose, carboxymethyl cellulose and sodium polyacrylate; anionic surfactants in the manner of sodium dodecyl benzene sulfonate, sodium octadecyl sulfate, sodium oleate, sodium laurate and potassium stearate; cationic surfactants in the manner of lauryl amine acetate and lauryl trimethyl ammonium chloride; amphoteric surfactants in the manner of lauryl dimethyl amine oxide; nonionic surfactants in the manner of polyoxyethylene alkyl ethers, polyoxyethylene alkyl phenyl ethers and polyoxyethylene alkyl amines; and inorganic compounds in the manner of tricalcium phosphate, aluminum hydroxide, calcium sulfate, calcium carbonate and barium carbonate.

Furthermore, one type of these dispersion stabilizers may be used alone or two or more types may be used in combination as necessary.

Although there are no particular limitations on the mean particle diameter of the aggregate formed here, it is normally preferably controlled so as to be about the same size as the weight-average particle diameter (D4) of the toner particles to be obtained. The particle diameter of the aggregate can be easily controlled by suitably setting and altering the temperature during addition and mixing of the aggregating agent and the above-mentioned stirring and mixing conditions. Moreover, the above-mentioned pH adjuster, the above-mentioned surfactant and the like are preferably suitably added to prevent melt adhesion among toner particles.

[Fusion Step]

In the fusion step, toner particles are formed by fusing the above-mentioned aggregate particles by heating.

The heating temperature is between the glass transition temperature (Tg) of the resin contained in the aggregate particles and the decomposition temperature of the resin. For example, aggregate particles are fused and combined by interrupting the progression of aggregation by adding a surfactant or pH adjuster while stirring in the same manner as the aggregation step, and heating to a temperature equal to or higher than the glass transition temperature of the resin of the resin particles.

The heating time is that to a degree which allows fusion to be carried out adequately, and more specifically, is from about 10 minutes to 10 hours.

In addition, a step can be further included before or after the fusion step in which a fine particle liquid dispersion in which fine particles have been dispersed is added and mixed to adhere the fine particles to the above-mentioned aggregate particles and form a core-shell structure (adhesion step).

[Washing Step]

Toner particles are obtained by washing, filtering, drying and so forth the toner particles obtained following the fusion step under suitable conditions. In this case, the above-mentioned toner particles are preferably washed adequately in order to ensure adequate charging performance and reliability of the toner.

There are no particular limitations on the washing method, and for example, a suspension containing toner particles is filtered, and the resulting residue is stirred and washed using distilled water followed by filtration. From the viewpoint of charging performance of the toner, washing is preferably repeated until the electrical conductivity of the filtrate is 150 µS/cm or less. If electrical conductivity exceeds 150 µS/cm, charging performance of the toner decreases and as a result thereof, there is increased susceptibility to the occurrence of fogging, decreased image density and the like.

Moreover, inorganic powder such as silica, alumina, titania or calcium carbonate, or resin particles such as particles of a vinyl-based resin, polyester resin or silicone resin, may be added to the surface of the resulting toner particles by applying shearing force in a dry state. These inorganic powders and resin particles function as an external additive such as a flowability assistant or cleaning assistant.

[Drying Step]

A known method in the manner of ordinary vibrating fluidized bed drying, spray drying, freeze-drying or flash jet drying can be used for drying. The moisture content of the toner particles after drying is preferably 1.5% by mass or less and more preferably 1.0% by mass or less.

The weight-average particle diameter (D4) of the toner is preferably from 4.0 µm to 9.0 µm and more preferably from 4.9 µm to 7.5 µm. As a result of making the weight-average particle diameter (D4) of the toner to be within the above-mentioned ranges, charge stability during large-volume printing and reproducibility of halftone areas are further improved.

The ratio of weight-average particle diameter (D4) to number average particle diameter (D1) of the toner (to be referred to as the weight-average particle diameter/number average particle diameter, or [D4/D1]) is preferably 1.35 or less and more preferably 1.30 or less. As a result of making the [D4/D1] of the toner to be within the above-mentioned ranges, fogging and transferability improve and variations in line thickness of thin lines and the like can be held to a low level.

Furthermore, methods used to adjust the above-mentioned weight-average particle diameter (D4) and number average particle diameter (D1) vary according to the method used to produce the toner particles. For example, in the case of the suspension polymerization method, D4 and D1 can be adjusted by controlling the dispersant concentration used during preparation of the aqueous dispersion medium and by controlling the reaction stirring rate and the reaction stirring time and the like.

From the viewpoint of improving transferability, the average circularity of the toner as measured with a flow particle image analyzer is preferably from 0.930 to 0.995 and more preferably from 0.960 to 0.990.

The toner of the present invention may be a magnetic toner or non-magnetic toner.

In the case of using as a magnetic toner, the toner particles that compose the toner of the present invention may be used by mixing magnetic materials. Examples of such magnetic materials include iron oxides in the manner of magnetite, maghemite and ferrite, iron oxides containing other metal oxides, metals in the manner of Fe, Co and Ni, alloys of these metals and metals in the manner of Al, Co, Cu, Pb, Mg, Ni, Sn, Zn, Sb, Be, Bi, Cd, Ca, Mn, Se, Ti, W and V, and mixtures thereof.

[Liquid Developer Production Method]

The following provides an explanation of a method for producing a liquid developer.

First, in order to obtain a liquid developer, a binder resin, a colorant containing the phthalocyanine pigment having a structure represented by general formula (1), and as necessary, an assistant in the manner of a charge control agent or wax, are dispersed or dissolved in an electrically resistant liquid carrier. In addition, the liquid developer may also be produced using a two-stage method in which the toner of the present invention is first produced followed by diluting this with an electric insulation liquid carrier to prepare a developer.

There are no particular limitations on the disperser used for the above-mentioned dispersion, and, for example, a media disperser in the manner of a rotary shear homogenizer, ball mill, sand mill or attritor, or a high-pressure counter collision type disperser, is used preferably.

In addition to the phthalocyanine pigment having a structure represented by general formula (1), known pigments, dyes and the like can be used alone or as a combination of two or more types thereof in the above-mentioned colorant. The use of wax is the same as that described regarding toner.

There are no particular limitations on the charge control agent provided it is that which is used in liquid developers for electrostatic charge image development, and examples thereof include cobalt naphthenate, copper naphthenate, copper oleate, cobalt oleate, zirconium octoate, cobalt octoate, sodium dodecyl benzene sulfonate, calcium dodecyl benzene sulfonate, soy bean lecithin and aluminum octoate.

There are no particular limitations on the electric insulation liquid carrier, and, for example, an organic solvent having high electrical resistance of $1 \times 10^9$ Ω·cm or higher and low dielectric constant of 3 or less is used preferably.

Specific examples thereof include aliphatic hydrocarbon-based solvents in the manner of hexane, pentane, octane, nonane, decane, undecane and dodecane, Isopar H, G, K, L and M (manufactured by Exxon Chemical Corp.), and Linear Ren Dimer A-20 and A-20H (manufactured by Idemitsu Kosan Co., Ltd.). Furthermore, those having a boiling point within the temperature range of 68° C. to 250° C. are preferable. These electric insulation liquid carriers may be used alone or two or more types may be used in combination within a range that does not increase the viscosity of the system.

EXAMPLES

Although the following provides a more detailed explanation of the present invention by indicating examples and comparative examples, the present invention is not limited to these examples. Furthermore, the terms "parts" and "%" used in the explanation are based on mass unless specifically indicated otherwise.

[Synthesis of Dichlorosilyl Phthalocyanine]

Silane tetrachloride (1.8 parts) was dropped into a liquid dispersion of 1,3-diiminoisoindoline (1.0 part) in quinoline (10 parts) in a nitrogen atmosphere while being careful of generation of heat. Following completion of dropping, the temperature was raised to 230° C. followed by stirring for 5 hours. Following completion of the reaction, the reaction mixture was cooled to room temperature and the resulting solid was filtered under reduced pressure. The resulting solid was then dispersed in N,N-dimethylformamide (DMF) followed by raising the temperature to 80° C. Impurities were removed by filtering while still hot to obtain a biaxial phthalocyanine in the form of dichlorosilyl phthalocyanine (yield: 70%).

Production Example 1

Production of Compound (1)

Sodium hydride (0.5 parts) was gradually added to a toluene (10 parts) solution of neopentyl glycol (0.3 parts) in a nitrogen atmosphere. Next, after gradually adding the above-mentioned dichlorosilyl phthalocyanine (1.0 part), the mixture was refluxed while heating for 5 hours. Following completion of the reaction, the mixture was diluted with n-hexane and the precipitated solid was filtered. The resulting solid was washed with ethanol and ion exchange water to obtain Compound (1) (yield: 92%).

The resulting Compound (1) was placed in a filter paper thimble and subjected to Soxhlet extraction to obtain a compound in which the number of repeating units n of the above-mentioned Compound (1) is 0 ((1)-0), a compound in which the number of repeating units n is 1 ((1)-1), and a compound in which the number of repeating units n is 2 ((1)-2) from the extract. In addition, compounds in which the number of repeating units n is 3 or more ((1)-n) were obtained from the residue remaining in the filter paper thimble following Soxhlet extraction. When the mass ratio of each component was analyzed, the ratio of [(1)-1]:[(1)-2]:[(1)-n] was 1:5:94. Furthermore, Soxhlet extraction was carried out changing the extraction solvent to (a) ethanol, (b) toluene and (c) mixed solvent of toluene and ethanol (mass ratio: 10/1) in that order.

Furthermore, the numbers of repeating units n of Compounds ((1)-1) and ((1)-2) were determined using molecular sieve gel column chromatography in tetrahydrofuran solution (HLC-8220GPC manufactured by Tosoh Corp.). The results of FT-IR analysis of Compound (1) consisted of 2820 cm$^{-1}$, 2920 cm$^{-1}$ and 1060 cm$^{-1}$.

Unless specifically indicated otherwise, FT-IR spectra were subsequently measured directly with powder using the Spectrum One FT-IR Spectrometer manufactured by PerkinElmer Inc.

Production Example 2

Production of Purified Product of Compound (1)

Compound (1) obtained in Production Example 1 was subjected to Soxhlet extraction using the same method as the above-mentioned Production Example 1 of Compound 1 to obtain a purified product of Compound (1) in which compounds in which the numbers of repeating units n were 0 to 2 were removed from the above-mentioned Compound (1) (yield: 87%).

The results of FT-IR analysis of the purified product of Compound (1) consisted of 2820 cm$^{-1}$, 2920 cm$^{-1}$ and 1060 cm$^{-1}$.

Production Example 3

Production of Compound (8)

Compound (8) was obtained using the same method as Production Example 1 with the exception of changing the neopentyl glycol used in Production Example 1 to 1,4-cyclohexane dimethanol (0.53 parts) (yield: 85%).

The resulting Compound (8) was subjected to Soxhlet extraction using the same method as the above-mentioned Production Example 1 of Compound 1, and a compound in which the number of repeating units n of the above-mentioned Compound (8) is 0 ((8)-0), a compound in which the number of repeating units n is 1 ((8)-1), and a compound in which the number of repeating units n is 2 ((8)-2) were obtained from the extract. In addition, compounds in which the number of repeating units n is 3 or more ((8)-n) were obtained from the residue remaining in the filter paper thimble following Soxhlet extraction. When the mass ratio of each component was analyzed, the ratio of [(8)-1]:[(8)-2]:[(8)-n] was 1:4:95.

Furthermore, the numbers of repeating units n of Compounds ((8)-1) and ((8)-2) were determined using molecular sieve gel column chromatography in tetrahydrofuran solution (HLC-8220GPC manufactured by Tosoh Corp.). The results of FT-IR analysis of Compound (8) consisted of 2820 cm$^{-1}$, 2920 cm$^{-1}$ and 1060 cm$^{-1}$.

Production Example 4

Production of Compound (11)

Compound (11) was obtained using the same method as Production Example 1 with the exception of changing the neopentyl glycol used in Production Example 1 to 1,3-adamantane dimethanol (0.67 parts) (yield: 83%).

The resulting Compound (11) was subjected to Soxhlet extraction using the same method as the above-mentioned Production Example 1 of Compound 1, and a compound in which the number of repeating units n of the above-mentioned Compound (11) is 0 ((11)-0), a compound in which the number of repeating units n is 1 ((11)-1), and a compound in which the number of repeating units n is 2 ((11)-2) were obtained from the extract. In addition, compounds in which the number of repeating units n is 3 or more ((11)-n) were obtained from the residue remaining in the filter paper thimble following Soxhlet extraction. When the mass ratio of each component was analyzed, the ratio of [(11)-1]:[(11)-2]:[(11)-n] was 1:3:96.

Furthermore, the numbers of repeating units n of Compounds ((11)-1) and ((11)-2) were determined using molecular sieve gel column chromatography in tetrahydrofuran solution (HLC-8220GPC manufactured by Tosoh Corp.). The results of FT-IR analysis of Compound (11) consisted of 2820 $cm^{-1}$, 2920 $cm^{-1}$ and 1060 $cm^{-1}$.

Production Example 5

Production Compound (1) By-Product

A by-product of Compound (1) in the form of a phthalocyanine compound was obtained from the extract of Production Example 2 by removing the solvent with an evaporator (yield: 10%). Furthermore, since this by-product of Compound (1) is not a pigment, but rather a liposoluble dye that is soluble in an organic solvent in the manner of chloroform, toluene or DMF, the high lightfastness characteristic of pigment was not obtained.

[Synthesis of Tert-butyl Dichlorosilyl Phthalocyanine]

Silane tetrachloride (1.8 parts) was dropped into a liquid dispersion of 5-t-Bu-1,3-diiminoisoindoline (1.0 part) in quinoline (10 parts) in a nitrogen atmosphere while being careful of generation of heat. Following completion of dropping, the temperature was raised to 230° C. followed by stirring for 5 hours. Following completion of the reaction, the reaction mixture was cooled to room temperature and the resulting solid was filtered under reduced pressure. The resulting solid was then dispersed in N,N-dimethylformamide (DMF) followed by raising the temperature to 80° C. The dispersion was then filtered while still hot to obtain a biaxial phthalocyanine in the form of dichlorosilyl phthalocyanine (yield: 73%).

Production Example 6

Production of Compound (25)

Sodium hydride (0.5 parts) was gradually added to a toluene (10 parts) solution of neopentyl glycol (0.3 parts) in a nitrogen atmosphere. Next, after gradually adding tert-butyl dichlorosilyl phthalocyanine (1.0 part), the mixture was refluxed while heating for 5 hours. Following completion of the reaction, the mixture was diluted with n-hexane and the precipitated solid was filtered. The resulting solid was washed with ethanol and ion exchange water to obtain the target Compound (25) (yield: 90%).

The resulting Compound (25) was subjected to Soxhlet extraction using the same method as the above-mentioned Production Example 1 of Compound 1, and a compound in which the number of repeating units n of the above-mentioned Compound (25) is 0 ((25)-0), a compound in which the number of repeating units n is 1 ((25)-1), and a compound in which the number of repeating units n is 2 ((25)-2) were obtained from the extract. In addition, compounds in which the number of repeating units n is 3 or more ((25)-n) were obtained from the residue remaining in the filter paper thimble following Soxhlet extraction. When the mass ratio of each component was analyzed, the ratio of [(25)-1]:[(25)-2]:[(25)-n] was 1:4:85.

Furthermore, the numbers of repeating units n of Compounds ((25)-1) and ((25)-2) were determined using molecular sieve gel column chromatography in tetrahydrofuran solution (HLC-8220GPC manufactured by Tosoh Corp.). The results of FT-IR analysis of Compound (25) consisted of 2820 $cm^{-1}$, 2920 $cm^{-1}$ and 1060 $cm^{-1}$.

Production Example 7

Production of Compound (26)

Compound (26) was obtained using the same method as Production Example 6 with the exception of changing the neopentyl glycol used in Production Example 6 to 1,4-cyclohexane dimethanol (0.53 parts) (yield: 83%).

The resulting Compound (26) was subjected to Soxhlet extraction using the same method as the above-mentioned Production Example 1 of Compound 1, and a compound in which the number of repeating units n of the above-mentioned Compound (26) is 0 ((26)-0), a compound in which the number of repeating units n is 1 ((26)-1), and a compound in which the number of repeating units n is 2 ((26)-2) were obtained from the extract. In addition, compounds in which the number of repeating units n is 3 or more ((26)-n) were obtained from the residue remaining in the filter paper thimble following Soxhlet extraction. When the mass ratio of each component was analyzed, the ratio of [(26)-1]:[(26)-2]:[(26)-n] was 1:2:83.

Furthermore, the numbers of repeating units n of Compounds ((26)-1) and ((26)-2) were determined using molecular sieve gel column chromatography in tetrahydrofuran solution (HLC-8220GPC manufactured by Tosoh Corp.). The results of FT-IR analysis of Compound (26) consisted of 2820 $cm^{-1}$, 2920 $cm^{-1}$ and 1060 $cm^{-1}$.

Production Example 8

Production of Compound (27)

Compound (27) was obtained using the same method as Production Example 6 with the exception of changing the neopentyl glycol used in Production Example 6 to 1,3-adamantane dimethanol (0.67 parts) (yield: 83%).

The resulting Compound (27) was subjected to Soxhlet extraction using the same method as the above-mentioned Production Example 1 of Compound 1, and a compound in which the number of repeating units n of the above-mentioned Compound (27) is 0 ((27)-0), a compound in which the number of repeating units n is 1 ((27)-1), and a compound in which the number of repeating units n is 2 ((27)-2) were obtained from the extract. In addition, compounds in which the number of repeating units n is 3 or more ((27)-n) were obtained from the residue remaining in the filter paper thimble following Soxhlet extraction. When the mass ratio of each component was analyzed, the ratio of [(27)-1]:[(27)-2]:[(27)-n] was 1:4:90.

Furthermore, the numbers of repeating units n of Compounds ((27)-1) and ((27)-2) were determined using molecular sieve gel column chromatography in a tetrahydrofuran solution (HLC-8220GPC manufactured by Tosoh Corp.). The results of FT-IR analysis of Compound (27) consisted of 2820 cm$^{-1}$, 2920 cm$^{-1}$ and 1060 cm$^{-1}$.

On the other hand, the room temperature solubilities of the resulting Compound (1), purified product of Compound (1), Compound (8), Compound (11), Compound (25), Compound (26) and Compound (27) in solvents such as chloroform, toluene, DMF or water were all confirmed to be less than 0.1% by mass.

[Production of Toner]

Toner of the present invention and comparative toners were produced according to the methods described below.

Example 1

A mixture of 12 parts of Compound (1) and 120 parts of styrene were dispersed for 3 hours with an attritor (Mitsui Mining Co., Ltd.) to obtain a Pigment Dispersion (1).

710 parts of ion exchange water and 450 parts of a 0.1 mol/L aqueous trisodium phosphate solution were added to a 2 L four-mouth flask equipped with a T.K. Homomixer high-speed stirrer (Primix Corp.) followed by adjusting the rotating speed to 12000 rpm and heating to 60° C. 68 parts of 1.0 mol/L aqueous calcium chloride solution were gradually added thereto to prepare an aqueous medium containing a slightly water-insoluble dispersion stabilizer in the form of calcium phosphate.

Next, materials consisting of:
- 133.2 parts of Pigment Dispersion (1),
- 46.0 parts of styrene,
- 34.0 parts of n-butyl acrylate,
- 2.0 parts of an aluminum salicylate compound (Bontron E-88,
  Orient Chemical Industries Co., Ltd.),
- 10.0 parts of a polar resin (polycondensate of propylene oxide-modified bisphenol A and isophthalic acid, glass transition temperature (Tg)=65° C., weight-average molecular
  weight (Mw)=10000, number average molecular weight (Mn)=6000),
- 25.0 parts of an ester wax (peak temperature of maximum endothermic peak in DSC measurement=70° C., Mn=704), and
- 0.10 parts of divinyl benzene were heated to 60° C. and mixed at 5000 rpm using a T.K. Homomixer. 10 parts of polymerization initiator in the form of 2,2'-azobis(2,4-dimethylvaleronitrile) were dissolved therein to prepare a polymerizable monomer composition. This polymerizable monomer composition was then charged into the above-mentioned aqueous medium followed by granulating for 15 minutes while maintaining a rotating speed of 12000 rpm. Subsequently, the stirrer was changed from the high-speed stirrer to a propeller stirring blade, and after continuing polymerization for 5 hours at a liquid temperature of 60° C., the liquid temperature was raised to 80° C. and polymerization was continued for 8 hours. Following completion of polymerization, residual monomer was distilled off under reduced pressure at 80° C. followed by cooling the liquid temperature to 30° C. to obtain a polymer fine particle dispersion.

Next, the polymer fine particle dispersion was transferred to a washing vessel, and the pH was adjusted to 1.5 by adding dilute hydrochloric acid while stirring followed by stirring for 2 hours. Solid-liquid separation was then carried out with a filter to obtain polymer fine particles. Re-dispersion of the polymer fine particles in water and solid-liquid separation were repeated until phosphoric acid and calcium compounds including calcium phosphate were adequately removed. Subsequently, the polymer fine particles following the final solid-liquid separation were adequately dried with a dryer to obtain Toner Particles (1).

1.00 part of a hydrophobic silica fine powder subjected to surface treatment with hexamethyldisilazane (primary particle number average particle diameter: 7 nm), 0.15 parts of rutile titanium oxide fine powder (primary particle number average particle diameter: 45 nm), and 0.50 parts of rutile titanium oxide fine powder (primary particle number average particle diameter: 200 nm) were dry-mixed with respect to 100 parts of the resulting toner particles with a Henschel mixer (Nippon Coke & Engineering Co., Ltd.) to obtain Toner (1).

Examples 2 to 4

Toners (2), (3) and (4) were obtained in the same manner as Example 1 with the exception of changing Compound (1) in Example 1 to the purified product of Compound (1), Compound (8) and Compound (11), respectively.

Example 5

Toner (5) was obtained in the same manner as Example 1 with the exception of using a mixture of 6 parts of Compound (11) and 6 parts of C.I. Pigment Blue 15:3 instead of using 12 parts of Compound (1).

Comparative Example 1

Comparative Toner (C1) was obtained in the same manner as Example 1 with the exception of changing Compound (1) in Example 1 to dichlorosilyl phthalocyanine.

Comparative Example 2

Comparative Toner (C2) was obtained in the same manner as Example 1 with the exception of changing Compound (1) in Example 1 to Comparative Compound (1) indicated below.

[Chem. 10]

Comparative Compound (1)

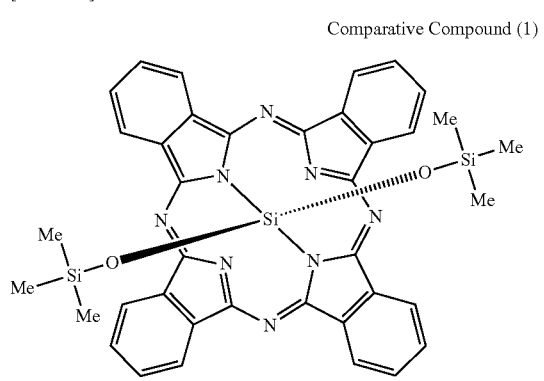

Comparative Example 3

Comparative Toner (C3) was obtained in the same manner as Example 1 with the exception of changing Compound (1) in Example 1 to Comparative Compound (2) indicated below.

[Chem. 11]

Comparative Compound (2)

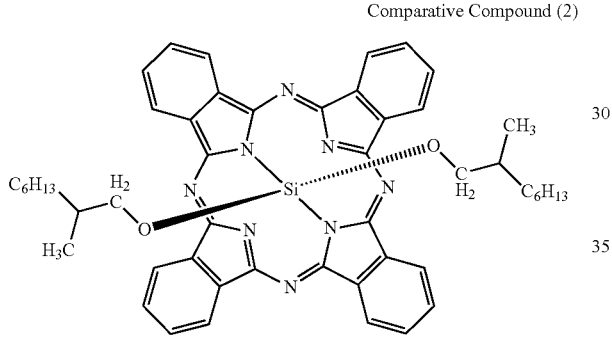

Comparative Example 4

Comparative Toner (C4) was obtained in the same manner as Example 1 with the exception of changing Compound (1) in Example 1 to Comparative Compound (3) indicated below.

[Chem. 12]

Comparative Compound (3)

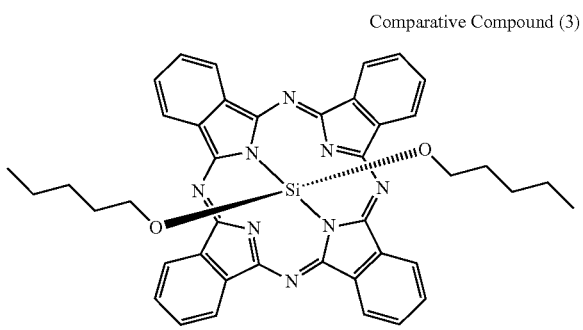

Comparative Example 5

Comparative Toner (C5) was obtained in the same manner as Example 1 with the exception of changing Compound (1) in Example 1 to Comparative Compound (4) indicated below.

[Chem. 13]

Comparative Compound (4)

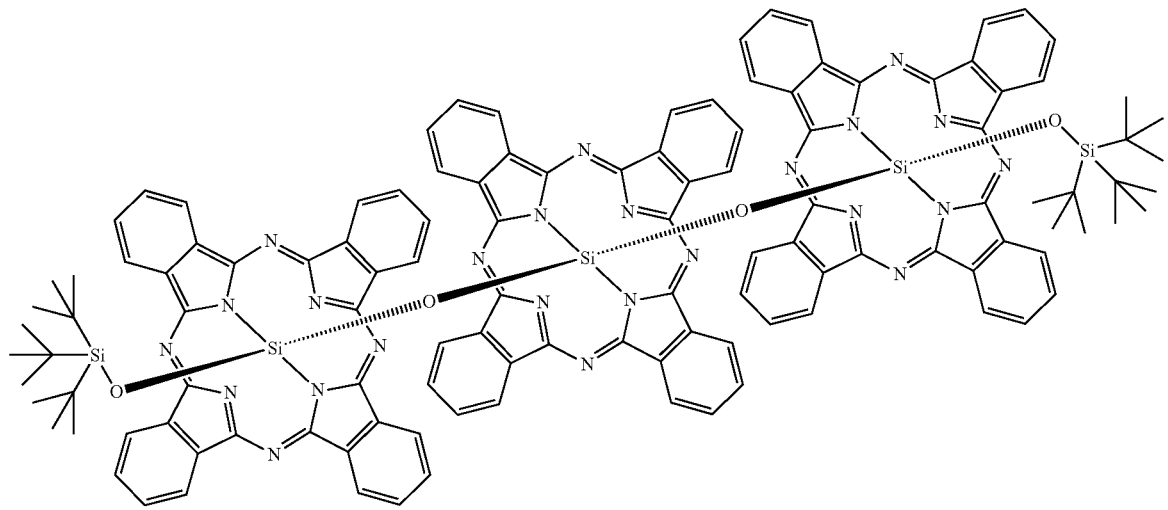

Comparative Example 6

Comparative Toner (C6) was obtained in the same manner as Example 1 with the exception of changing Compound (1) in Example 1 to Comparative Compound (5) indicated below.

[Chem. 14]

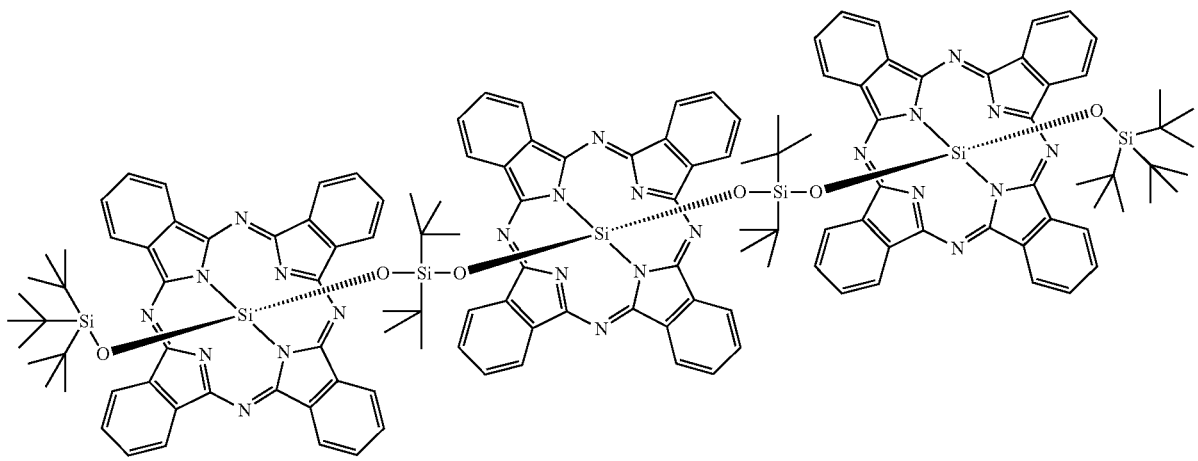

Comparative Compound (5)

Example 6

82.6 parts of styrene, 9.2 parts of n-butyl acrylate, 1.3 parts of acrylic acid, 0.4 parts of hexanediol acrylate and 3.2 parts of n-lauryl mercaptan were mixed and dissolved. An aqueous solution of 150 parts of ion exchange water containing 1.5 parts of Neogen RK (Daiichi Kogyo Seiyaku Co., Ltd.) was added to this solution and dispersed therein. An aqueous solution of 10 parts of ion exchange water containing 0.15 parts of potassium persulfate was further added thereto while stirring slowly for 10 minutes. After replacing the atmosphere with nitrogen, emulsion polymerization was carried out for 6 hours at 70° C. Following completion of polymerization, the reaction liquid was cooled to room temperature followed by the addition of ion exchange water to obtain a resin particle liquid dispersion having a solid content concentration of 12.5% by mass and a volume-based median diameter of 0.2 μm.

100 parts of ester wax (peak temperature of maximum endothermic peak in DSC measurement=70° C., Mn=704) and 15 parts of Neogen RK were mixed in 385 parts of ion exchange water followed by dispersing for about 1 hour using the JN100 Wet Jet Mill (Jokoh Co., Ltd.) to obtain a wax particle liquid dispersion. The solid content concentration of the wax particle liquid dispersion was 20% by mass.

100 parts of Compound (1) and 15 parts of Neogen RK were mixed in 885 parts of ion exchange water followed by dispersing for about 1 hour using the JN100 Wet Jet Mill (Jokoh Co., Ltd.) to obtain Colorant Particle Liquid Dispersion (1). The volume-based median diameter of the colorant particles was 0.15 μm.

After dispersing 160 parts of the resin particle liquid dispersion, 10 parts of the wax particle liquid dispersion, 10 parts of Colorant Particle Liquid Dispersion (1) and 0.2 parts of magnesium sulfate using a homogenizer (Ultra-Turrax T50, IKA Works Inc.), the dispersion was heated to 65° C. while stirring. After stirring for 1 hour at 65° C., aggregate particles having a mean particle diameter of about 5.5 μm were confirmed to have formed when observed with a light microscope. After adding 2.2 parts of Neogen RK (Daiichi Kogyo Seiyaku Co., Ltd.), the mixture was heated to 80° C. and stirred for 120 minutes to obtain fused spherical toner particles. After cooling and filtering, the filtered solid was stirred and washed for 60 minutes with 720 parts of ion exchange water. The solution containing the toner particles was then filtered and washing was repeated in the same manner until the electrical conductivity of the filtrate became 150 μS/cm or less. The toner particles were then dried using a vacuum dryer to obtain Toner Particles (2).

1.8 parts of silica fine powder subjected to hydrophobic treatment and having a specific surface area as determined by BET of 200 m²/g were dry-mixed with 100 parts of the above-mentioned Toner Particles (2) with a Henschel mixer (Sumitomo Mining Co., Ltd.) to obtain Toner (6).

Examples 7 to 9

Toners (7), (8) and (9) were obtained in the same manner as Example 6 with the exception of changing Compound (1) in Example 6 to the purified product of Compound (1), Compound (8) and Compound (11), respectively.

Example 10

Materials consisting of:
100 parts of binder resin (polyester resin) [composition (acid
  components: terephthalic acid, trimellitic acid, alcohol
  components: bisphenol A propylene oxide adduct), glass
    transition temperature: 55° C., acid value: 20 mgKOH/g,
    hydroxyl value: 16 mgKOH/g, molecular weight: Mp
    4500,
Mn 2300,
Mw 38000],
6 parts of Compound (1),
0.5 parts of an aluminum 1,4-di-t-butylsalicylate compound, and
5 parts of paraffin wax (peak temperature of maximum endothermic
    peak in DSC measurement: 78° C.)

were mixed with a Henschel mixer (Model FM-75J, Mitsui Mining Co., Ltd.) followed by kneading at a feed rate of 60 kg/hr with a biaxial kneader (Model PCM-45, Ikegai Ironworks Corp.) set to a temperature of 130° C. (kneaded product temperature at time of discharge: about 150° C.) After cooling the resulting kneaded product and coarsely pulverizing with a hammer mill, the pulverized kneaded product was finely pulverized at a feed rate of 20 kg/hr with a mechanical pulverizer (T-250, Turbo Kogyo Co., Ltd.).

Moreover, the resulting finely pulverized powder was classified with a multi-grade classifier utilizing the Coanda effect to obtain toner particles.

1.8 parts of silica fine powder subjected to hydrophobic treatment and having a specific surface area as determined by BET of 200 $m^2/g$ were dry-mixed with 100 parts of the resulting toner particles with a Henschel mixer (Mitsui Mining Co., Ltd.) to obtain Toner (10).

Examples 11 to 13

Toners (11), (12) and (13) were obtained in the same manner as Example 10 with the exception of changing Compound (1) in Example 10 to the purified product of Compound (1), Compound (8) and Compound (11), respectively.

Examples 14 to 16

Toners (14), (15) and (16) were obtained in the same manner as Example 1 with the exception of changing Compound (1) in Example 1 to Compound (25), Compound (26) and Compound (27), respectively.

Particle size distribution of the above-mentioned toners was evaluated in the manner described below. Furthermore, the evaluation results are indicated in Table 1 to be subsequently described.

<Evaluation of Toner Particle Size Distribution>

Toner particle size distribution was evaluated by using an indicator thereof represented with the ratio (D4/D1) of weight-average particle diameter (D4) to the number average particle diameter (D1) of the toner as obtained with a Coulter Counter.

Measurements were carried out using the Coulter Counter TA-II or Coulter Multisizer II (Beckman Coulter, Inc.) for the measuring apparatus in accordance with the operating manual provided. An approximately 1% aqueous sodium chloride solution was prepared using first grade sodium chloride for use as electrolyte. In the present invention, Isoton-II (Coulter Scientific Japan, K.K.) was used for the electrolyte. The specific measurement method consisted of adding 0.1 ml to 5 ml of dispersant in the form of surfactant (and preferably an alkyl benzene sulfonate) to 100 ml to 150 ml of the above-mentioned electrolyte, followed by the further addition of 2 mg to 20 mg of measurement sample (toner). The electrolyte having the sample suspended therein was subjected to dispersion treatment for about 1 minute to 3 minutes with an ultrasonic disperser. The resulting treated liquid dispersion was then used to measure the volume and particle count of toner of 2.00 μm or larger using a measuring apparatus equipped with a 100 μm aperture for the aperture, followed by calculating the volume distribution and number distribution of the toner. Next, the values of number average particle diameter (D1) determined from the number distribution of the toner, weight-average particle diameter (D4) determined from the volume distribution of the toner (using the median value of each channel as the representative value of each channel), and the ratio (D4/D1) were determined.

A total of 13 channels consisting of 2.00 μm to 2.52 μm, 2.52 μm to 3.17 μm, 3.17 μm to 4.00 μm, 4.00 μm to 5.04 μm, 5.04 μm to 6.35 μm, 6.35 μm to 8.00 μm, 8.00 μm to 10.08 μm, 10.08 μm to 12.70 μm, 12.70 μm to 16.00 μm, 16.00 μm to 20.20 μm, 20.20 μm to 25.40 μm, 25.40 μm to 32.00 μm and 32.00 μm to 40.30 μm were used for the above-mentioned channels.

Evaluations were carried out in accordance with the criteria indicated below. Furthermore, the closer the value of D4/D1 is to 1, the more favorable the particle size distribution.

A: (D4/D1) of 1.30 or less
B: (D4/D1) of 1.31 to 1.35
C: (D4/D1) of 1.36 or more <Evaluation of Toner Color Development Property>

Color development property was evaluated by comparing relative absorption intensity of evaluation samples obtained by melting and pressing toner onto a glass substrate. Relative absorption intensity in the present invention refers to the ratio (Q/B) of Q band intensity observed at the characteristic wavelength of 600 nm to 700 nm of phthalocyanine compounds to Soret band intensity B observed at wavelength of 200 nm to 300 nm. This is because, Q band intensity, which responds sharply to the external environment, has a strong influence on color development property in the case of phthalocyanine compounds. Furthermore, specific methods used to prepare evaluation samples and evaluate the samples are described below.

[Preparation of Toner Color Development Property Evaluation Samples]

0.5 g of toner were uniformly spread out on a 2 $cm^2$ glass substrate followed by hot-pressing at 160° C. and 1 kg with a Big Heater (Imoto Machinery Co., Ltd.) to prepare samples for evaluation of color development property.

[Measurement of Toner Color Development Property]

Color development property of the resulting samples for evaluation of color development property was evaluated by measuring the UV spectra thereof (UV-3600 UV-VIS-NIR Spectrophotometer, Shimadzu Corp.).

Evaluations were carried out in accordance with the criteria indicated below. A large value for Q/B indicates high color development property.

A: Q/B of 1.80 or more
B: Q/B of 1.30 to less than 1.80
C: Q/B of less than 1.30

TABLE 1

| | Compound | Toner No. | Particle Size Distribution | | Color Development Property | |
|---|---|---|---|---|---|---|
| | | | D4/D1 | Evaluation | Q/B | Evaluation |
| Ex. 1 | Compound (1) | 1 | 1.33 | B | 1.63 | B |
| Ex. 2 | Purified product of Compound (1) | 2 | 1.28 | A | 1.59 | B |
| Ex. 3 | Compound (8) | 3 | 1.27 | A | 1.75 | B |

TABLE 1-continued

|  | Compound | Toner No. | Particle Size Distribution D4/D1 | Evaluation | Color Development Property Q/B | Evaluation |
|---|---|---|---|---|---|---|
| Ex. 4 | Compound (11) | 4 | 1.26 | A | 1.85 | A |
| Ex. 5 | Compound (11) + C.I. Pigment Blue 15:3 | 5 | 1.33 | B | 1.44 | B |
| Ex. 6 | Compound (1) | 6 | 1.24 | A | 1.61 | B |
| Ex. 7 | Purified product of Compound (1) | 7 | 1.27 | A | 1.57 | B |
| Ex. 8 | Compound (8) | 8 | 1.24 | A | 1.77 | B |
| Ex. 9 | Compound (11) | 9 | 1.27 | A | 1.89 | A |
| Ex. 10 | Compound (1) | 10 | 1.28 | A | 1.62 | B |
| Ex. 11 | Purified product of Compound (1) | 11 | 1.22 | A | 1.65 | B |
| Ex. 12 | Compound (8) | 12 | 1.27 | A | 1.81 | A |
| Ex. 13 | Compound (11) | 13 | 1.29 | A | 1.88 | A |
| Ex. 14 | Compound (25) | 14 | 1.22 | A | 5.78 | A |
| Ex. 15 | Compound (26) | 15 | 1.21 | A | 5.88 | A |
| Ex. 16 | Compound (27) | 16 | 1.22 | A | 5.72 | A |
| Comp. Ex. 1 | Dichlorosilyl phthalocyanine | C1 | 1.33 | B | 1.25 | C |
| Comp. Ex. 2 | Comparative Compound (1) | C2 | 1.92 | C | 1.67 | B |
| Comp. Ex. 3 | Comparative Compound (2) | C3 | 1.85 | C | 1.38 | B |
| Comp. Ex. 4 | Comparative Compound (3) | C4 | 2.02 | C | 1.27 | C |
| Comp. Ex. 5 | Comparative Compound (4) | C5 | 1.41 | C | 1.18 | C |
| Comp. Ex. 6 | Comparative Compound (5) | C6 | 1.95 | C | 1.45 | B |

As shown in Table 1, the toner of the present invention has favorable color development property.

In addition, the toner production method of the present invention allows the obtaining of a toner having favorable particle size distribution and color development property.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183478, filed Aug. 22, 2012, which is hereby incorporated by reference herein in its entirety.

What is claimed is:
1. A toner comprising
a binder resin and a colorant,
wherein
the colorant contains a phthalocyanine pigment having a structure represented by the following general formula (1):

General Formula (1)

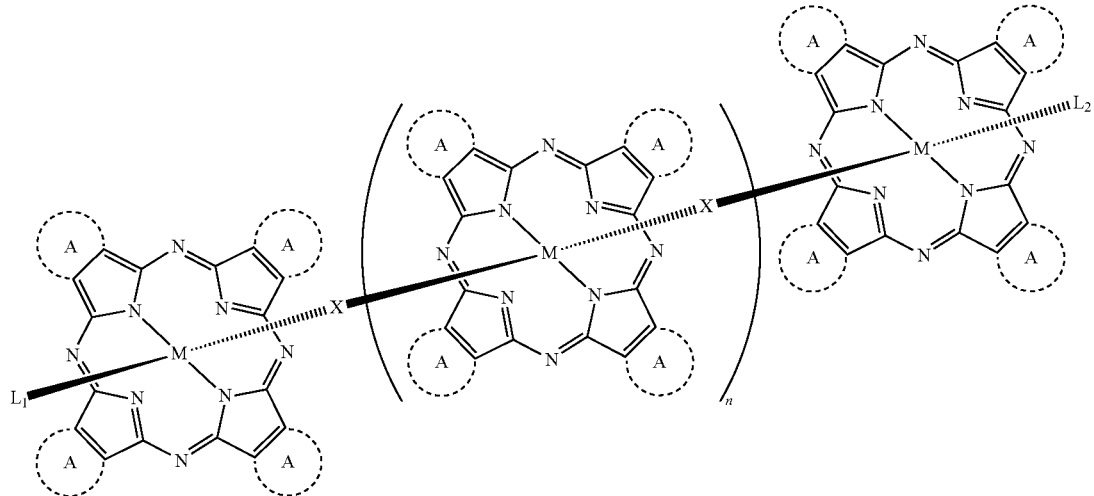

[in general formula (1), wherein
X represents —O—CH$_2$—R$^1$—CH$_2$—O—;
R$^1$ represents
   a monocyclic or polycyclic cyclic hydrocarbon group
   or
   —CR$^2$R$^3$—;
R$^2$ and R$^3$ represent alkyl group;

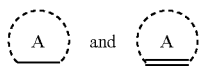

each independently represent
   a substituted or unsubstituted aryl ring
   or
   a heterocycle containing one or two nitrogen atoms;
M represents a metal atom selected from the group consisting of Si, Ge and Sn;
L$_1$ and L$_2$ each independently represent a halogen atom, hydroxyl group, —O—CH$_2$—R$^4$—CH$_2$—OR$^8$, —O—CH$_2$—R$^5$—OR$^9$ or —OR$^{10}$;
R$^4$ and R$^5$ represent
   a monocyclic or polycyclic cyclic hydrocarbon group
   or
   —CR$^6$R$^7$—;
R$^6$ and R$^7$ represent alkyl group;
R$^8$ to R$^{10}$ each independently represent a hydrogen atom, methyl group or trimethylsilyl group; and
n represents an integer of 1 or more].

2. The toner according to claim 1, wherein R$^1$ in the general formula (1) is a monocyclic or polycyclic cyclic hydrocarbon group.

3. The toner according to claim 2, wherein R$^1$ in the general formula (1) is a norbornanediyl group, norbornenediyl group or adamantanediyl group.

4. The toner according to claim 1, wherein

in the general formula (1) are each independently a substituted or unsubstituted benzene ring, pyridine ring or pyrazine ring.

5. The toner according to claim 1, wherein

in the general formula (1) are each independently a substituted or unsubstituted benzene ring.

6. The toner according to claim 1, wherein

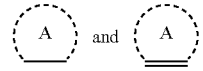

in the general formula (1) are each independently a benzene ring having a tert-butyl group.

7. The toner according to claim 1, wherein M in the general formula (1) is Si.

8. The toner according to claim 1, further containing a wax.

9. A method of producing a toner, comprising the step of producing toner particles
   by dispersing a polymerizable monomer composition containing a polymerizable monomer and a colorant in an aqueous medium, and granulating particles of the polymerizable monomer composition followed by polymerizing the polymerizable monomer,
wherein
the colorant contains a phthalocyanine pigment having a structure represented by the following general formula (1):

General Formula (1)

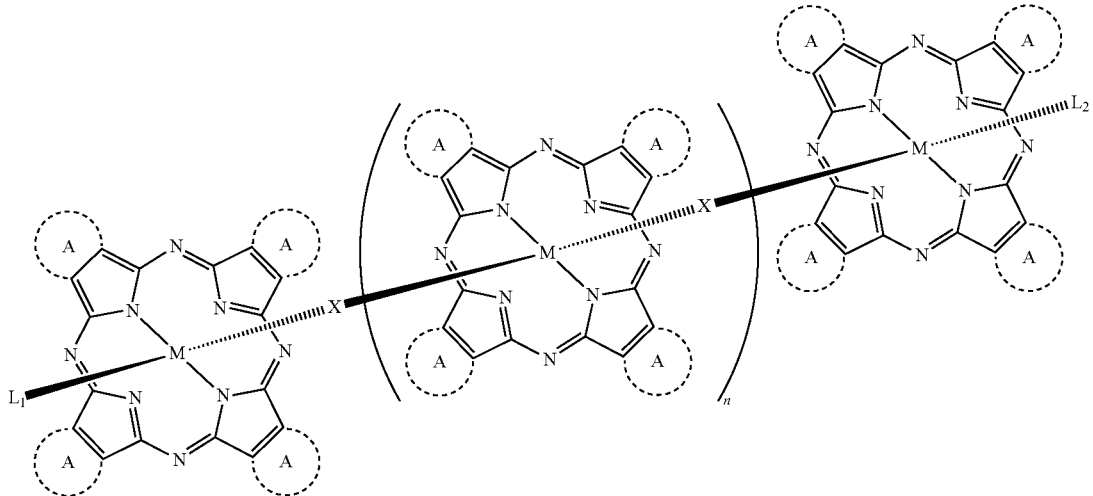

[in general formula (1), wherein
X represents —O—CH$_2$—R$^1$—CH$_2$—O—;
R$^1$ represents
   a monocyclic or polycyclic cyclic hydrocarbon group
   or
   —CR$^2$R$^3$—;
R$^2$ and R$^3$ represent alkyl group;

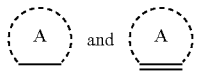

each independently represent
   a substituted or unsubstituted aryl ring
   or
   a heterocycle containing one or two nitrogen atoms;
M represents a metal atom selected from the group consisting of Si, Ge and Sn;
L$_1$ and L$_2$ each independently represent a halogen atom, hydroxyl group, —O—CH$_2$—R$^4$—CH$_2$—OR$^8$, —O—CH$_2$—R$^5$—OR$^9$ or —OR$^{10}$;
R$^4$ and R$^5$ represent
   a monocyclic or polycyclic cyclic hydrocarbon group
   or
   —CR$^6$R$^7$—;
R$^6$ and R$^7$ represent alkyl group;
R$^8$ to R$^{10}$ each independently represent a hydrogen atom, methyl group or trimethylsilyl group; and
n represents an integer of 1 or more].

10. The method of producing a toner according to claim 9, wherein R$^1$ in the general formula (1) is a monocyclic or polycyclic cyclic hydrocarbon group.

11. The method of producing a toner according to claim 10, wherein R$^1$ in the general formula (1) is a norbornanediyl group, norbornenediyl group or adamantanediyl group.

12. The method of producing a toner according to claim 9, wherein

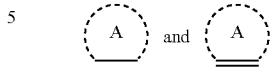

in the general formula (1) are each independently a substituted or unsubstituted benzene ring, pyridine ring or pyrazine ring.

13. The method of producing a toner according to claim 9, wherein

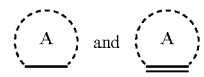

in the general formula (1) are each independently a substituted or unsubstituted benzene ring.

14. The method of producing a toner according to claim 9, wherein

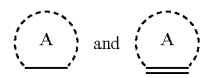

in the general formula (1) are each independently a benzene ring having a tert-butyl group.

15. The method of producing a toner according to claim 9, wherein M in the general formula (1) is Si.

16. The method of producing a toner according to claim 9, wherein the polymerizable monomer composition further contains a wax.

\* \* \* \* \*